(12) United States Patent
Kasuga et al.

(10) Patent No.: US 9,977,315 B2
(45) Date of Patent: May 22, 2018

(54) PROJECTOR INCLUDING A COVER MEMBER THAT COVERS A PROJECTING SECTION OF THE PROJECTOR AND A PROJECTION WINDOW PROVIDED IN THE COVER MEMBER

(71) Applicant: Seiko Epson Corporation, Tokyo (JP)

(72) Inventors: Hirofumi Kasuga, Matsumoto (JP);
Takeshi Ishikawa, Azumino (JP);
Tadashi Kinebuchi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/248,392

(22) Filed: Aug. 26, 2016

(65) Prior Publication Data

US 2017/0082911 A1    Mar. 23, 2017

(30) Foreign Application Priority Data

Sep. 17, 2015    (JP) ................. 2015-183746

(51) Int. Cl.
*G03B 21/14*    (2006.01)
*G03B 21/28*    (2006.01)
*G03B 21/16*    (2006.01)

(52) U.S. Cl.
CPC ........... *G03B 21/145* (2013.01); *G03B 21/16* (2013.01); *G03B 21/28* (2013.01)

(58) Field of Classification Search
CPC ........ G03B 21/10; G03B 21/14; G03B 21/28; G03B 21/142; G03B 21/145
See application file for complete search history.

(56) References Cited

U.S. PATENT DOCUMENTS

| 2008/0252859 | A1* | 10/2008 | Nagahata | G03B 21/16 353/61 |
| 2009/0153809 | A1* | 6/2009 | Amano | G03B 21/28 353/99 |
| 2010/0321646 | A1* | 12/2010 | Nakano | G03B 21/14 353/119 |
| 2011/0063580 | A1* | 3/2011 | Amano | G02B 17/08 353/20 |
| 2011/0242506 | A1* | 10/2011 | Uchiyama | G03B 21/14 353/98 |
| 2012/0236265 | A1* | 9/2012 | Watanabe | G03B 21/30 353/61 |
| 2013/0128240 | A1* | 5/2013 | Yoshida | H04N 9/3155 353/85 |
| 2014/0307234 | A1* | 10/2014 | Okura | G03B 21/145 353/119 |

FOREIGN PATENT DOCUMENTS

| JP | 2009-48155 A | 3/2009 |
| JP | 2010-164685 A | 7/2010 |

* cited by examiner

*Primary Examiner* — Sultan Chowdhury
(74) *Attorney, Agent, or Firm* — ALG Intellectual Property, LLC

(57) ABSTRACT

A projector includes a projector main body disposed in an attic above a ceiling plate and configured to project image light on a screen located in a room interior below the ceiling plate, a cover member set on the ceiling plate and configured to cover the projector main body, and a projection window provided in the cover member and configured to transmit the image light projected from the projector main body to the room interior side. The projection window is disposed further on the attic side than the ceiling plate to tilt with respect to the ceiling plate.

9 Claims, 28 Drawing Sheets

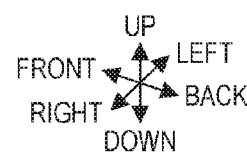
FIG. 5A
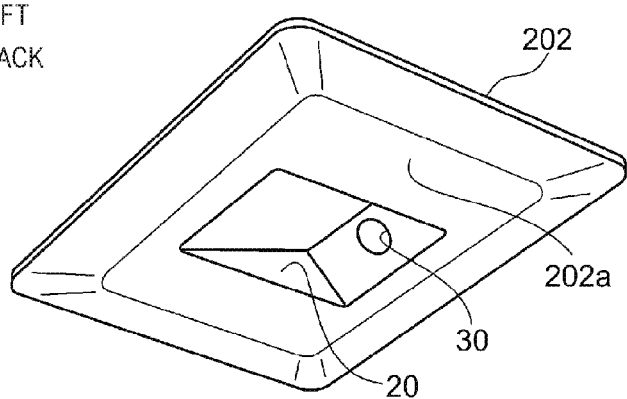
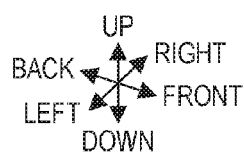
FIG. 5B
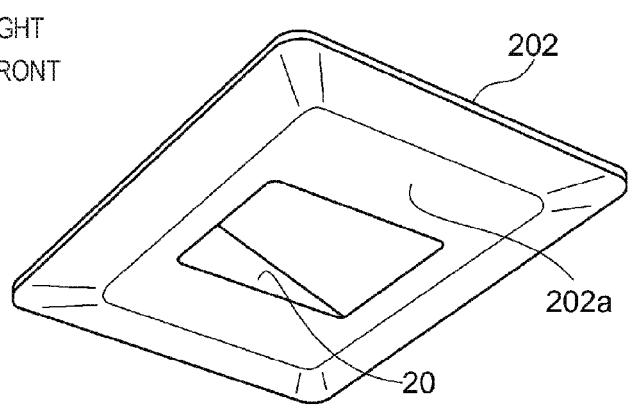

PROJECTOR INCLUDING A COVER MEMBER THAT COVERS A PROJECTING SECTION OF THE PROJECTOR AND A PROJECTION WINDOW PROVIDED IN THE COVER MEMBER

The entire disclosure of Japanese Patent Application No. 2015-183746, filed Sep. 17, 2015 is expressly incorporated by reference herein.

BACKGROUND

1. Technical Field

The present invention relates to a projector.

2. Related Art

There has been known a projector suspended from the ceiling of a meeting room or the like and used. In the projector suspended from the ceiling and set, since a housing is exposed to a room interior, dust adheres to and accumulates on the housing or is conspicuous in appearance. On the other hand, there has been known a projector housed in an attic and used (see, for example, JP-A-2010-164685 (Patent Literature 1)). In the projector described in Patent Literature 1, a housing is set in the attic and an emitting section provided on the bottom surface of the housing is set to protrude from an opening formed in the ceiling to the lower side (i.e., the room interior side). With such a configuration, compared with the projector suspended from the ceiling and set, since the housing is not exposed to the room interior, the adhesion of dust is suppressed and the dust is not conspicuous in appearance.

However, in the projector described in Patent Literature 1, the emitting section provided on the bottom surface of the housing sometimes catches the eye because the emitting section protrudes to the room interior from the ceiling. For example, when the projector is used in a store where the atmosphere in an indoor space is considered important such as a clothing store or a restaurant, it is likely that the atmosphere is spoiled. Therefore, there is a demand for a projector that does not include a portion protruding to the room interior from the ceiling and does not spoil atmosphere even in a place where the atmosphere in the indoor space is considered important.

SUMMARY

An advantage of some aspects of the invention is to solve at least a part of the problems described above, and the invention can be implemented as the following forms or application examples.

Application Example 1

A projector according to an application example 1 includes: a projecting section disposed in a space on one side of a reference plane and configured to project image light on a projection surface located on the other side of the reference plane; a cover member set on the reference plane and configured to cover the projecting section; and a projection window provided in the cover member and configured to transmit the image light projected from the projecting section to the other side. The projection window is disposed further on the one side than the reference plane to tilt with respect to the reference plane.

With the configuration of this application example, the projecting section of the projector is disposed on the one side opposite to the other side where the image light is projected on the reference plane. The projecting section is covered with the cover member set on the reference plane. The projection window provided in the cover member and configured to transmit the image light projected from the projecting section to the other side is also disposed on the one side opposite to the other side where the image light is projected on the reference plane. Therefore, for example, if the reference plane is assumed to be a ceiling, the one side of the reference plane is assumed to be an attic, and the other side is assumed to be a room interior, the projecting section and the projection window of the projector do not protrude to the room interior from the reference plane (the ceiling). The projecting section is covered with the cover member and is not exposed. Consequently, it is possible to provide the projector that does not spoil atmosphere in a place where the atmosphere in an indoor space is considered important.

Application Example 2

In the projector according to the application example, it is preferable that a recessed section recessed to the one side of the reference plane is formed in the cover member, and the projection window is disposed in the recessed section.

With the configuration of this application example, the recessed section recessed to the one side of the reference plane is formed in the cover member and the projection window is disposed in the recessed section. Therefore, it is possible to dispose the projection window further on the one side (the attic) than the reference plane (the ceiling) on which the cover member is set.

Application Example 3

In the projector according to the application example, it is preferable that a lid that covers the recessed section is provided in the cover member.

With the configuration of this application example, since the recessed section formed in the cover member is covered with the lid, adhesion of dust to the projection window is suppressed. Since the recessed section is covered with the lid, in appearance, the cover member and the lid are visually recognized as if the cover member and the lid are integral. Therefore, it is possible to make the entire cover member less conspicuous.

Application Example 4

In the projector according to the application example, it is preferable that an external shape of the image light projected on the projection surface is a rectangular shape, and an external shape of the recessed section is also the rectangular shape.

With the configuration of this application example, the external shape of the image light projected on the projection surface and the external shape of the recessed section through which the image light passes are the same rectangular shape. Therefore, compared with when the external shape of the recessed section is different from the external shape of the image light, it is possible to allow the image light to pass in a smaller opening area. Consequently, it is possible to reduce the external shape of the recessed section.

Application Example 5

In the projector according to the application example, it is preferable that the external shape of the image light projected on the projection surface is a substantially circular shape, and the external shape of the recessed section is also the substantially circular shape.

With the configuration of this application example, the external shape of the image light projected on the projection surface and the external shape of the recessed section through which the image light passes are the same substantially circular shape. Therefore, compared with when the external shape of the recessed section is different from the external shape of the image light, it is possible to allow the image light to pass in a smaller opening area. Consequently, it is possible to reduce the external shape of the recessed section.

Application Example 6

In the projector according to the application example, it is preferable that the projection window is disposed substantially perpendicularly to an optical axis of the image light projected from the projecting section.

With the configuration of this application example, the projection window tilts with respect to the reference plane and is disposed substantially perpendicularly to the optical axis of the image light projected from the projecting section. Therefore, even if the projecting section is disposed in the attic, it is possible to emit the image light in an oblique direction toward the room interior and project the image light on the projection surface set on the room interior side. Compared with when the projection window is parallel to the reference plane with respect to the spread of the image light projected from the projecting section (i.e., when the projection window is not disposed substantially perpendicularly to the optical axis of the image light), it is possible to reduce the external shape of the projection window through which the image light is transmitted.

Application Example 7

In the projector according to the application example, it is preferable that a transparent plate or a lens is disposed in the projection window.

With the configuration of this application example, when the transparent plate is disposed in the projection window, intrusion of dust into the projecting section side from the projection window is suppressed. When the lens is disposed in the projection window, it is possible to enlarge, with the lens, the image light projected from the projecting section and project the image light on the projection surface.

Application Example 8

In the projector according to the application example, it is preferable that the projector includes a cooling section for cooling the projecting section, and an opening section for performing at least one of intake and exhaust for cooling is formed in the cover member.

With the configuration of this application example, the projector includes the cooling section for cooling the projecting section, and the opening section for performing at least one of intake and exhaust for cooling is formed in the cover member. Therefore, it is possible to discharge heat emitted from the projecting section disposed on the one side (the attic) of the reference plane (the ceiling) to the other side (the room interior) via the opening section and suck the air on the other side (the room interior) to the one side (the attic) to cool the projecting section with the cooling section.

Application Example 9

In the projector according to the application example, it is preferable that the cover member is set substantially in parallel to the reference plane.

With the configuration of this application example, the cover member is set substantially in parallel to the reference plane (the ceiling). Therefore, it is possible to make the cover member less conspicuous when viewed from the other side (the room interior).

Application Example 10

A projector according to this application example includes: a projecting section disposed in a space on one side of a reference plane during non-use and at least partially disposed on the other side of the reference plane during use and configured to project image light on a projection surface located on the other side of the reference plane; and a cover member set on the reference plane and configured to cover the projecting section during the non-use.

With the configuration of this application example, the projecting section of the projector is covered with the cover member disposed in the space on the one side of the reference plane during the non-use. Therefore, for example, if the reference plane is assumed to be a ceiling, the one side of the reference plane is assumed to be an attic, and the other side is assumed to be a room interior, the projecting section of the projector during the non-use does not protrude to the room interior from the reference plane and is covered with the cover member and not exposed. Therefore, atmosphere is not spoiled even in a place where the atmosphere of an indoor space is considered important.

BRIEF DESCRIPTION OF THE DRAWINGS

The invention will be described with reference to the accompanying drawings, wherein like numbers reference like elements.

FIG. 5A is a perspective view showing the exterior of a cover member according to an example 3.

FIG. 5B is a perspective view showing the exterior of the cover member according to the example 3.

DESCRIPTION OF EXEMPLARY EMBODIMENTS

Embodiments of the invention are explained below with reference to the drawings. The drawings referred to below are enlarged, reduced, or exaggerated as appropriate such that portions to be explained are shown in a recognizable state. Components other than components necessary for the explanation are sometimes not shown.

First Embodiment

Configuration of a Projector

Figure 1:
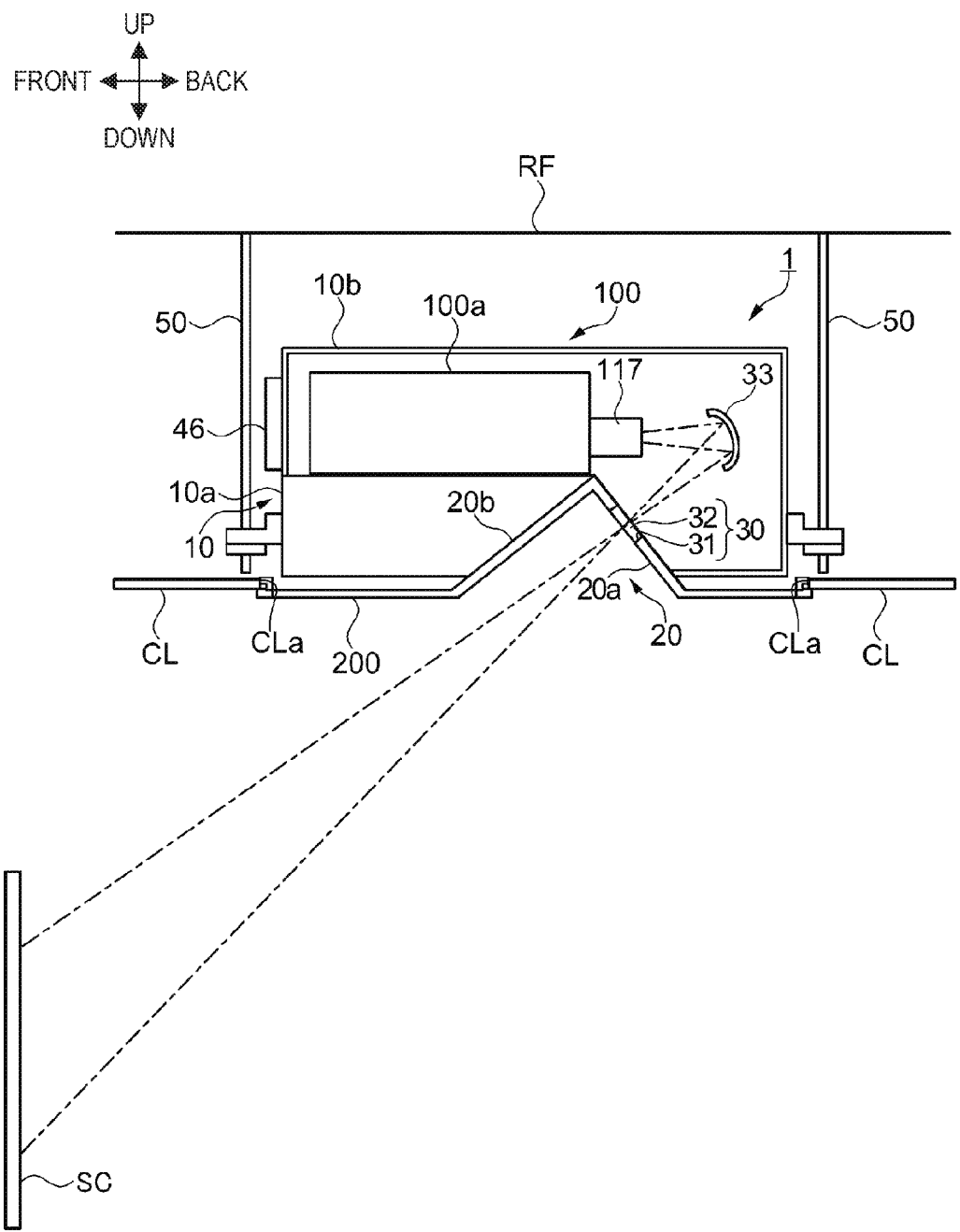
FIG. 1 is a schematic diagram showing the configuration of a projector according to a first embodiment.

First, the configuration of a projector according to a first embodiment is explained below with reference to FIG. 1. FIG. 1 is a schematic diagram showing the configuration of the projector according to the first embodiment. Specifically, FIG. 1 is a view of the projector according to the first embodiment viewed from the lateral direction (the left side).

A projector 1 according to the first embodiment shown in FIG. 1 is set in a space above a ceiling board CL (an attic) of a store, a meeting room, a hall, or the like. The ceiling board CL is an example of a reference plane in the invention. A space on one (upper) side of the ceiling plate CL is the attic. A space on the other (lower) side of the ceiling plate CL is a room interior. Image light (indicated by an alternate long and short dash line in FIG. 1) projected from the projector 1 is projected on a screen SC functioning as a projection surface located on the lower side of the ceiling plate CL.

Note that, in the following explanation, a direction parallel to the ceiling plate CL, which is the reference plane, and on a side where a screen SC is located with respect to the projector 1 is set as "front" and the opposite side of the side where the screen SC is located with respect to the projector 1 is set as "rear". When the projector 1 is viewed from the lower side, the right side as viewed from the rear side to the front side (to the screen SC) is set as a right direction and the left side as viewed from the rear side to the front side is set as a left direction.

The projector 1 includes a projector main body 100 functioning as a projecting section, a fixed member 10, and a cover member 200 in which a projection window 30 is provided. In FIG. 1, a housing 100a of the projector main body 100 and a projection lens 117 are shown. The projector main body 100 projects image light from the projection lens 117 to the rear side. The configuration of the projector main body 100 is explained below.

The projector 1 includes a reflecting mirror 33 disposed on the rear side with respect to the projection lens 117. The reflecting mirror 33 is configured by, for example, concave mirror. The reflecting mirror 33 is disposed to tilt in the downward direction in a position opposed to the projection lens 117. Therefore, the image light projected from the projection lens 117 to the rear side is reflected toward the front side and the lower side by the reflecting mirror 33.

Consequently, even if the projector main body 100 is disposed in the attic, the projector 1 can emit the image light in an oblique direction toward the room interior further on the lower side than the ceiling plate CL and project the image light on the screen SC. The image light projected from the projection lens 117 is reflected on the reflecting mirror 33 and projected on the screen SC. Consequently, compared with when the image light is directly projected on the screen SC from the projection lens 117, it is possible to increase optical path length of the image light from the projection lens 117 to the screen SC. Therefore, when the optical path length of the image light is the same length, it is possible to set the screen SC and the projector 1 close to each other.

The fixed member 10 includes a fixed table 10a and an outer frame 10b. The projector main body 100 is placed and fixed on the fixed table 10a substantially in parallel to the ceiling plate CL. Since the projector main body 100 is disposed substantially in parallel to the ceiling plate CL, even when the distance in the up-down direction between the ceiling plate CL and a main ceiling RF is short, compared with when the projector main body 100 is disposed to be tilted, it is possible to more easily set the projector main body 100.

The projector main body 100 is covered with an outer frame 10b. A cooling fan 46 functioning as a cooling section is provided in the outer frame 10b. The cooling fan 46 performs at least one of intake of the air for cooling the projector main body 100 into the fixed member 10 and exhaust of heat emitted from the projector main body 100 to the outside of the fixed member 10. Note that the fixed member 10 does not have to include the outer frame 10b. In that case, the cooling fan 46 does not have to be provided in the fixed member 10.

Suspension bars 50 extending along the up-down direction (the vertical direction) are attached to the fixed member 10. End portions of the suspension bars 50 are fixed to the main ceiling RF. The projector 1 is fixed in a space of the attic in a state in which the projector 1 is suspended from the main ceiling RF by the suspension bars 50. Note that, although not shown in the figure, the suspension bars 50 include mechanisms (screws, etc.) for adjusting the length of the suspension bars 50. Consequently, it is possible to adjust the setting height of the projector 1.

The cover member 200 is configured separately from the fixed member 10 and detachably set in an opening section CLa of the ceiling plate CL. The cover member 200 is set substantially in parallel to the ceiling plate CL. The cover member 200 is disposed to cover the lower (room interior) side of the projector main body 100 and the fixed member 10. In other words, the projector 1 does not include a portion protruding to the lower side from the ceiling plate CL to be exposed.

Therefore, the cover member 200 of the projector 1 is visually recognized from a person present in the room interior. However, the projector main body 100 and the fixed member 10 are not visually recognized. Since the cover member 200 is set substantially in parallel to the ceiling plate CL, it is possible to make the cover member 200 less conspicuous in appearance when viewed from the room interior side. Therefore, with the configuration of the projector 1, atmosphere is not spoiled even in a place where the atmosphere in a room interior space is considered important like a store such as a clothing store or a restaurant.

Note that, since the cover member 200 is detachably set on the ceiling plate CL, in the case of maintenance or the like of the projector main body 100, it is possible to remove the cover member 200 and perform work. It is also possible to replace the cover member 200 according to decoration of the room interior, the size of an image to be projected, and the like. Examples of the cover member 200 are explained below.

The cover member 200 includes a projection opening 20 functioning as a recessed section. The projection opening 20 is formed to recess further to the upper (attic) side than the ceiling plate CL. As shown in FIG. 1, the projection opening 20 is recessed in a triangular shape in the cross section in the front-back direction of the cover member 200. In other words, in the cross section in the front-back direction, the projection opening 20 includes two slopes 20a and 20b crossing on the upper side. The projection window 30 is provided in the slope 20a on the rear side of the projection opening 20. Since the projection window 30 is disposed further on the upper (attic) side than the ceiling plate CL, it is possible to make the projection window 30 less conspicuous.

Note that the cover member 200 may include a lid 34 (see FIG. 3C) that closes the projection opening 20 during non-use of the projector 1. Since the projection opening 20 is closed by the lid 34 during the non-use of the projector 1, adhesion of dust to the projection window 30 is suppressed. It is possible to make the entire cover member 200 less conspicuous.

The projection window 30 is configured by an opening section 31 formed on the slope 20a on the rear side of the projection opening 20 and a transparent plate 32 disposed in the opening section 31. The projection window 30 (the opening section 31) transmits image light projected from the projection lens 117 to the rear side and reflected on the reflecting mirror 33 toward the front side and the lower side. The image light transmitted through the projection window 30 is projected from the projection opening 20 to the front side and the lower side of the projector 1.

Since the reflecting mirror 33 is the concave mirror, the image light reflected on the reflecting mirror 33 is once condensed and transmitted through the projection window 30 (the opening section 31) and thereafter diffused (i.e., enlarged) and projected on the screen SC. Since the transparent plate 32 is disposed in the opening section 31 of the projection window 30, intrusion of dust into the inner side (the projector main body 100 side) of the cover member 200 from the projection window 30 is suppressed.

The projection window 30 (the slope 20a on the rear side of the projection opening 20 in which the projection window is provided) is desirably disposed substantially perpendicularly to an optical axis of the image light reflected on the reflecting mirror 33 and transmitted through the projection window 30. When the projection window 30 is disposed substantially perpendicularly to the optical axis of the image light transmitted through the projection window 30, it is possible to reduce the external shape of the projection window 30 compared with when the projection window 30 is not disposed substantially perpendicularly to the optical axis of the image light. Therefore, it is possible to make the projection window 30 much less conspicuous.

Note that a lens (not shown in the figure) may be disposed in the opening section 31 of the projection window 30 instead of the transparent plate 32. When the lens is disposed in the projection window 30, it is possible to further enlarge, with the lens, the image light reflected on the reflecting mirror 33 and project the image light on the screen SC at a wide angle. Therefore, it is possible to more easily adjust the position of an image and the size of the image corresponding to the distance between the screen SC and the projector 1. Even when the screen SC and the projector 1 are close to each other, it is possible to display a large image on the screen SC.

The transparent plate 32 (and the lens) may be detachably attachable to the opening section 31 of the projection window 30, that is, the transparent plate 32 and the lens may be replaceable. If the transparent plate 32 and the lens are detachably attachable from the outer side (the room interior side) of the cover member 200, for example, after the projector 1 is set in the attic, when the position of the screen SC is changed or the size of an image to be projected is changed, it is possible to more easily adjust the position and the size of the image with respect to the screen SC.

The screen SC is set on, for example, a wall, a window, or a partition of the room interior. The screen SC may be suspended from the ceiling plate CL or the main ceiling RF. When the screen SC is set on the wall or suspended from the main ceiling RF, in general, a projection surface extends along the vertical direction (a direction orthogonal to the ceiling plate CL). However, the screen SC tilting with respect to the vertical direction may be used as the projection surface. The image light may be projected using the wall, the window, the partition, or the like as the projection surface. In the following explanation, the description "project on the screen SC" includes projecting the image light on a surface other than the screen SC such as the wall, the window, the partition, or the like is the projection surface.

Configuration of the Projector Main Body

Figure 2:
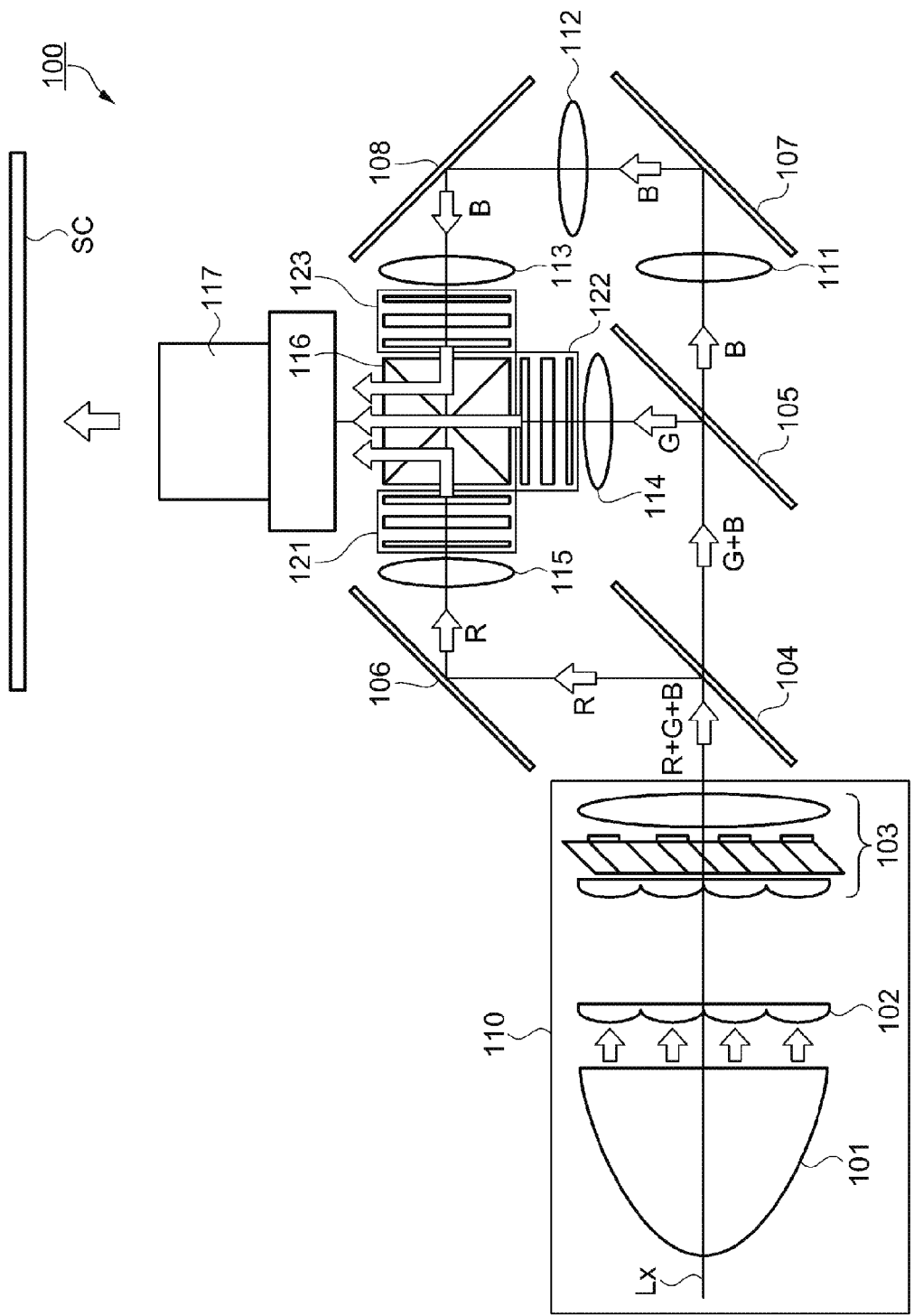
FIG. 2 is a schematic diagram showing an example of the configuration of a projector main body.

An example of the configuration of the projector main body 100 is explained with reference to FIG. 2. FIG. 2 is a schematic diagram showing an example of the configuration of the projector main body. Note that, in FIG. 2, illustration of the housing 100a is omitted.

As shown in FIG. 2, the projector main body 100 includes a polarization illumination device 110, two dichroic mirrors 104 and 105, three reflecting mirrors 106, 107, and 108, five relay lenses 111, 112, 113, 114, and 115, three liquid crystal light valves 121, 122, and 123, a cross dichroic prism 116, and the projection lens 117.

The polarization illumination device 110 includes a lamp unit 101 functioning as a light source configured from a white light source such as an ultra-high pressure mercury lamp or a halogen lamp, an integrator lens 102, and a polarization conversion element 103. The lamp unit 101, the integrator lens 102, and the polarization conversion element 103 are disposed along a system optical axis Lx.

The dichroic mirror 104 reflects red light (R) and transmits green light (G) and blue light (B) among polarized light beams emitted from the polarization illumination device 110. The other dichroic mirror 105 reflects the green light (G) transmitted through the dichroic mirror 104 and transmits the blue light (B).

The red light (R) reflected on the dichroic mirror 104 is reflected on the reflecting mirror 106 and thereafter made incident on the liquid crystal light valve 121 passing through the relay lens 115. The green light (G) reflected on the dichroic mirror 105 is made incident on the liquid crystal light valve 122 passing through the relay lens 114. The blue light (B) transmitted through the dichroic mirror 105 is made incident on the liquid crystal light valve 123 passing through a light guide system configured by the three relay lenses 111, 112, and 113 and the two reflecting mirrors 107 and 108.

The liquid crystal light valves 121, 122, and 123 of a transmission type, which are light modulating elements, are respectively disposed to be opposed to incident surfaces of the respective color rights of the cross dichroic prism 116. The color lights made incident on the liquid crystal light valves 121, 122, and 123 are modulated on the basis of video information (a video signal) and emitted toward the cross dichroic prism 116.

The cross dichroic prism 116 is configured by sticking together four right-angle prisms. A dielectric multilayer film that reflects the red light and a dielectric multilayer film that reflects the blue light are formed on the inner surface of the cross dichroic prism 116 in a cross shape. The three color lights are combined and light representing a color image is composed by the dielectric multilayer films. The composed light is projected toward the reflecting mirror 33 (see FIG. 1) by the projection lens 117, which is a projection optical system, and reflected on the reflecting mirror 33. An image is enlarged and displayed on the screen SC.

Examples of the Cover Member

As explained above, in the projector 1 according to this embodiment, the cover member 200 is visually recognized from a person present in the room interior. Therefore, in a place where the atmosphere of an indoor space is considered important, the cover member 200 desirably does not spoil the atmosphere of the indoor space. In this embodiment, a plurality of examples including different shapes and specifications are prepared such that the cover member 200 can be selected according to decoration of the room interior, the size of an image to be projected (the spread of image light), and the like. Examples of the cover member according to the first embodiment are explained below.

Example 1

Figure 3A:
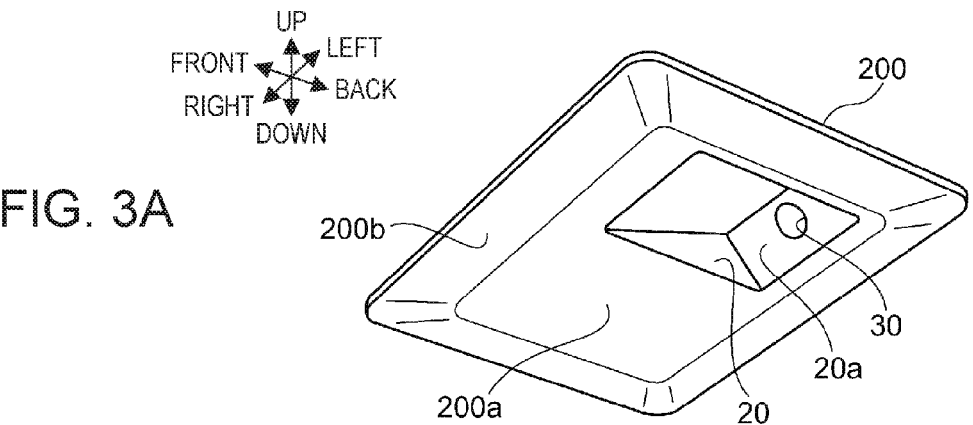
FIG. 3A is a perspective view showing the exterior of a cover member according to an example 1.
Figure 3B:
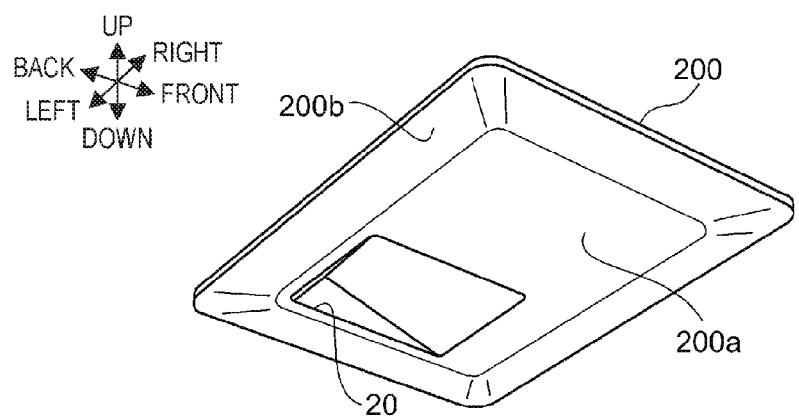
FIG. 3B is a perspective view showing the exterior of the cover member according to the example 1.
Figure 3C:
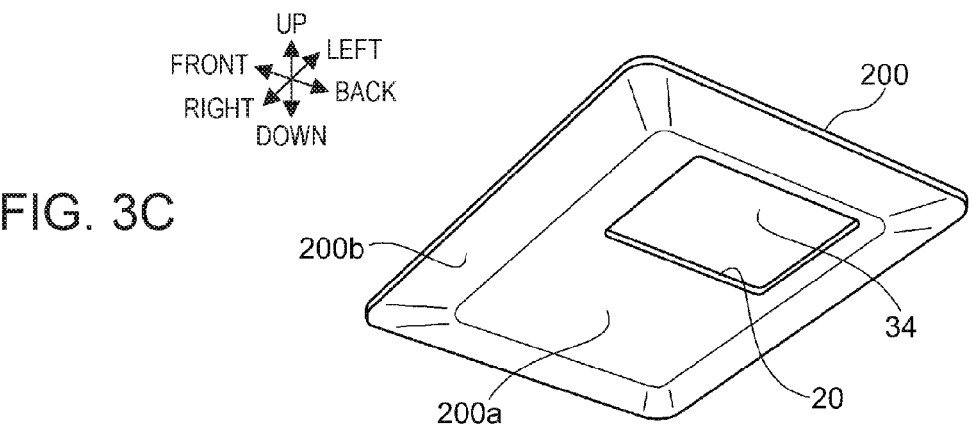
FIG. 3C is a perspective view showing the exterior of the cover member according to the example 1.

FIGS. 3A to 3C are perspective views showing the exterior of a cover member according to an example 1. Specifically, FIGS. 3A and 3C are views of the cover member 200 according to the example 1 viewed from the front and lower sides. FIG. 3B is a view of the cover member 200 viewed from the rear and lower sides. Note that, in FIGS. 3A to 3C, illustration of the ceiling plate CL is omitted.

As shown in FIGS. 3A to 3C, a plane shape of the cover member 200 according to the example 1 viewed from the lower side is a substantially rectangular shape. The plane shape of the projection opening 20 is also a substantially rectangular shape. The cover member 200 includes a plane section (a portion equivalent to the upper bottom of a trapezoid) 200a slightly swelled to the lower side in a trapezoidal shape and includes a slope section 200b at the peripheral edge of the plane section 200a. The plane section 200a is substantially parallel to the ceiling plate CL (see FIG. 1). The projection opening 20 and the projection window 30 are disposed close to a corner section on the left side and the rear side in the plane section 200a.

As shown in FIG. 3C, the cover member 200 according to the example 1 may include the lid 34 that closes the projection opening 20 during the non-use. Since the projection opening 20 is closed by the lid 34 during the non-use, adhesion of dust to the projection window 30 is suppressed. Further, when the projection opening 20 is closed by the lid 34, the plane section 200a and the lid 34 are visually recognized as if the plane section 200a and the lid 34 are integral in appearance. Therefore, it is possible to make the entire cover member 200 less conspicuous.

The lid 34 desirably has an exterior same as the exterior of the plane section 200a of the cover member 200 because the plane section 200a and the lid 34 are seen as if the plane section 200a and the lid 34 are integral. However, the lid 34 is not limited to such a form and may be, for example, a transparent plate. When the lid 34 is the transparent plate, it is possible to cover the projection window 30 with the transparent plate even during the use to suppress adhesion of dust to the projection window 30 due to static electricity.

Note that, in the cover member 200 according to the example 1, it is assumed that the external shape of an image projected on the screen SC is a rectangular shape. Therefore, the external shape of the projection opening 20 is also a substantially rectangular shape based on the premise that image light having a rectangular external shape is projected from the projection window 30.

Example 2

Figure 4A:
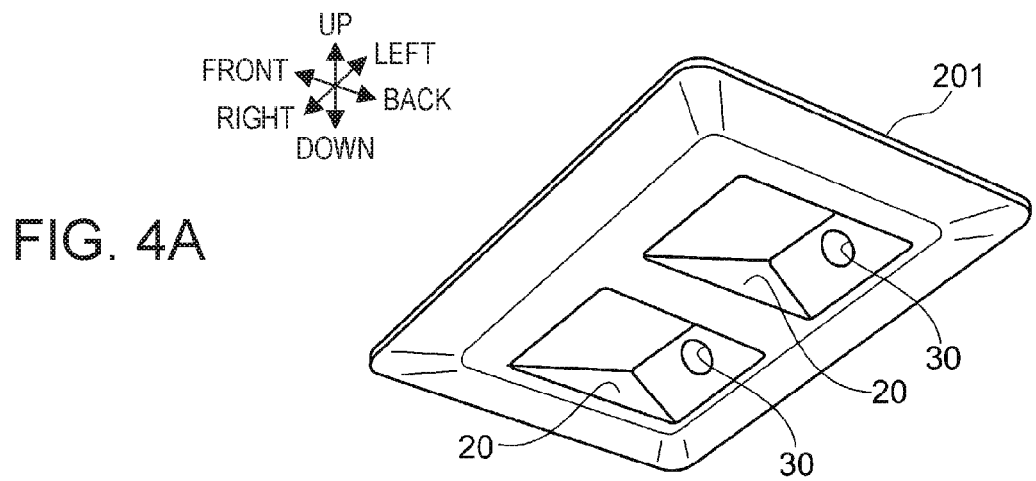
FIG. 4A is a perspective view showing the exterior of a cover member according to an example 2.
Figure 4B:
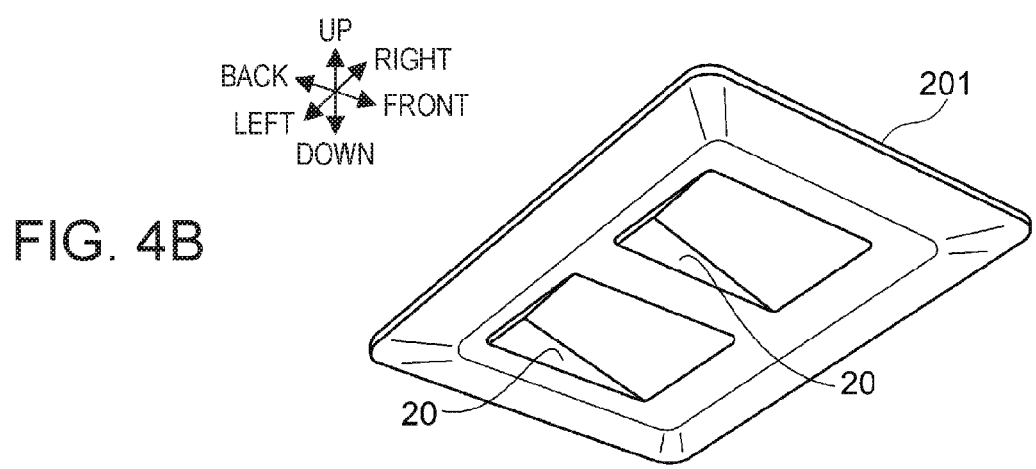
FIG. 4B is a perspective view showing the exterior of the cover member according to the example 2.
Figure 4C:
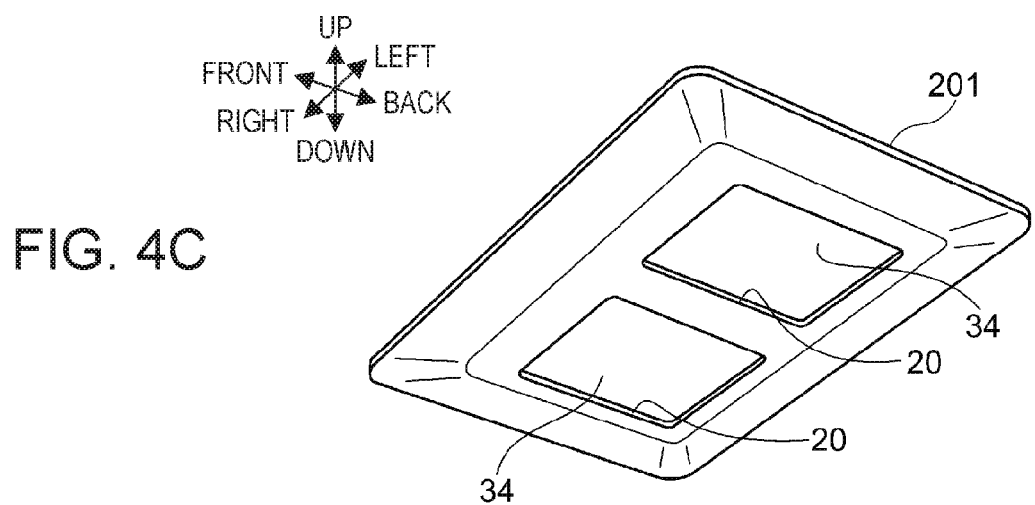
FIG. 4C is a perspective view showing the exterior of the cover member according to the example 2.

FIGS. 4A to 4C are perspective views showing the exterior of a cover member according to an example 2. Specifically, FIGS. 4A and 4C are views of a cover member 201 according to the example 2 viewed from the front and lower sides. FIG. 4B is a view of the cover member 201 viewed from the rear and lower sides.

As shown in FIGS. 4A to 4C, the cover member 201 according to the example 2 is different from the cover member 200 according to the example 1 in that the cover member 201 includes two projection openings 20 and two projection windows 30 on both the left and right sides. As shown in FIG. 4C, like the cover member 200 according to the example 1, the cover member 201 according to the example 2 may include lids 34 that respectively close the two projection openings 20 during the non-use.

In the configuration of the cover member 201 according to the second embodiment, two projector main bodies 100 (see FIG. 1) can be set side by side. Consequently, with the two projector main bodies 100, it is possible to display different images side by side on the screen SC, divide the left and the right of one image and display the image on the screen SC as a wide image, and superimpose images in the same region on the screen SC and stack and project the images.

Example 3

FIGS. 5A and 5B are perspective views showing the exterior of a cover member according to an example 3. Specifically, FIG. 5A is a view of a cover member 202 according to the example 3 viewed from the front and lower sides. FIG. 5B is a view of the cover member 202 viewed from the rear and lower sides. As shown in FIGS. 5A and 5B, the cover member 202 according to the example 3 is different from the cover member 200 according to the example 1 in that the projection opening 20 is disposed in the center in a plane section 202a of the cover member 202.

In the cover member 202 according to the example 3, the projection opening 20 is disposed in the center of the cover member 202 and symmetrically disposed in the front-back direction and the left-right direction. Therefore, a relaxed atmosphere is obtained in appearance. It is possible to give a sense of stability and a sense of security to the person present in the room interior. Note that, like the cover member 200 according to the example 1, the cover member 202 may include the lid 34 that closes the projection opening 20.

Example 4

Figure 6A:
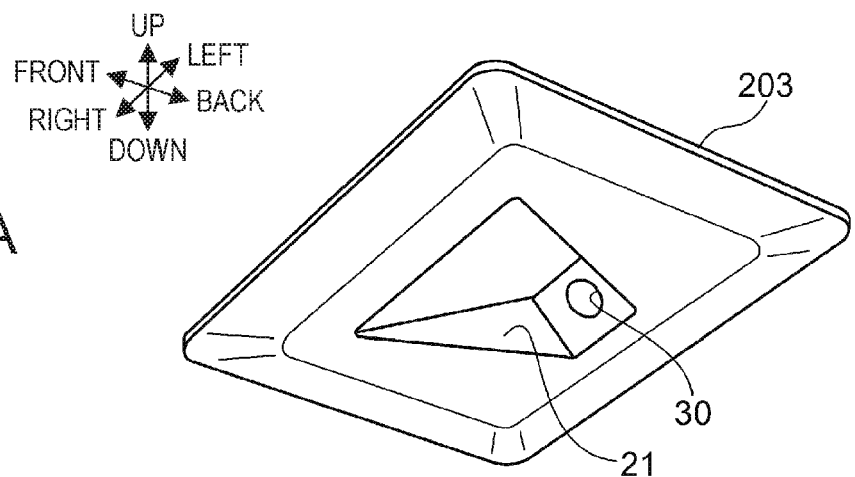
FIG. 6A is a perspective view showing the exterior of a cover member according to an example 4.
Figure 6B:
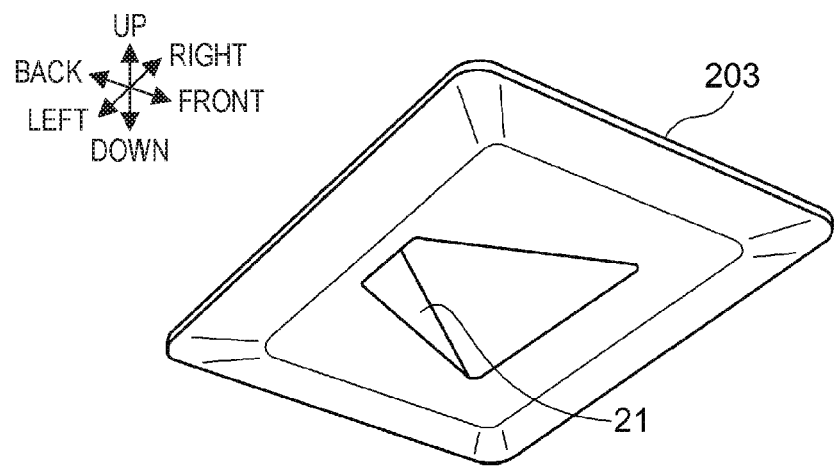
FIG. 6B is a perspective view showing the exterior of the cover member according to the example 4.

FIGS. 6A and 6B are perspective views showing the exterior of a cover member according to an example 4. Specifically, FIG. 6A is a view of a cover member 203 according to the example 4 viewed from the front and lower sides. FIG. 6B is a view of the cover member 203 viewed from the rear and lower sides. As shown in FIGS. 6A and 6B, the cover member 203 according to the example 4 is different from the cover member 202 according to the example 3 in that the plane shape of a projection opening 21 is a trapezoidal shape spreading toward the front.

In the cover member 203 according to the example 4, the projection opening 21 widens toward the front. Therefore, for example, even if the screen SC and the projector 1 are close to each other and image light is projected at a wide angle, image light can be projected on the screen SC without being blocked by the cover member 203.

Example 5

Figure 7A:
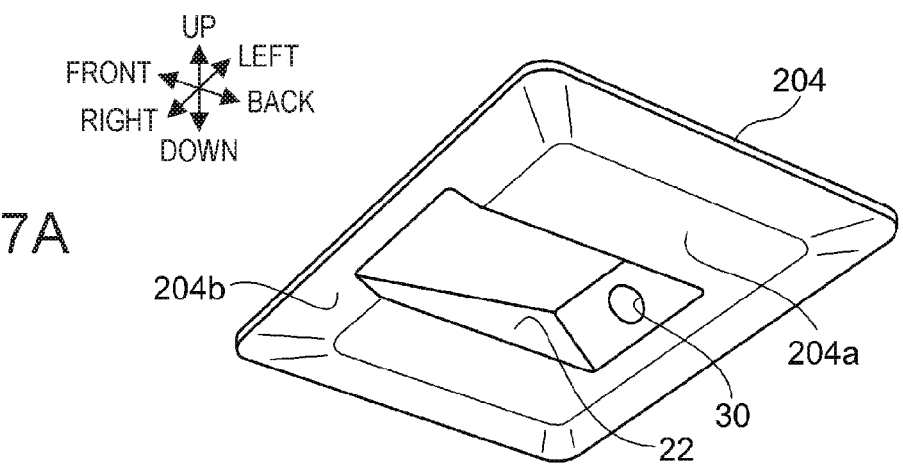
FIG. 7A is a perspective view showing the exterior of a cover member according to an example 5.
Figure 7B:
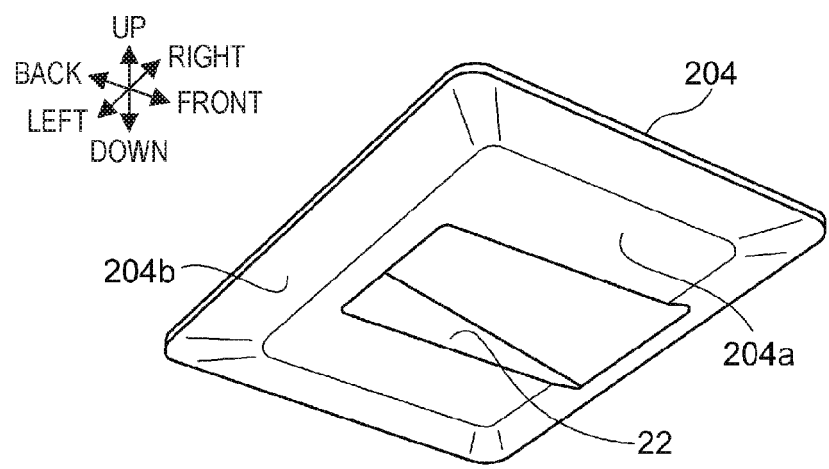
FIG. 7B is a perspective view showing the exterior of the cover member according to the example 5.

FIGS. 7A and 7B are perspective views showing the exterior of a cover member according to an example 5. Specifically, FIG. 7A is a view of a cover member 204 according to the example 5 viewed from the front and lower sides. FIG. 7B is a view of the cover member 204 viewed from the rear and lower sides. As shown in FIGS. 7A and 7B, the cover member 204 according to the example 5 is the same as the cover member 202 according to the example 3 in that the plane shape of a projection opening 22 is a rectangular shape. However, the cover member 204 according to the example 5 is different from the cover member 202 according to the example 3 in that the projection opening 22 is formed to extend to a slope section 204b in the front of the cover member 204.

In the cover member 204 according to the example 5, the projection opening 22 is formed to extend to the slope section 204b in the front. Therefore, for example, even when the screen SC is set in a (high) position closer to the ceiling plate CL, image light can be projected on the screen SC without being blocked by the cover member 204.

Example 6

Figure 8A:
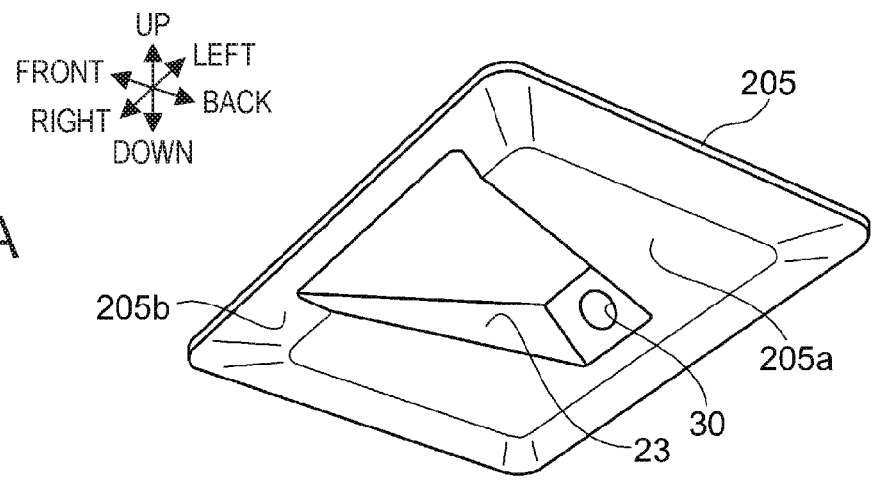
FIG. 8A is a perspective view showing the exterior of a cover member according to an example 6.
Figure 8B:
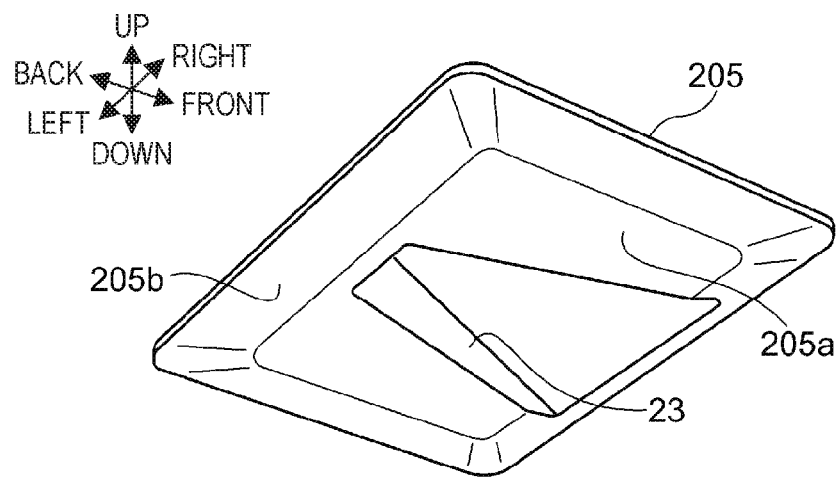
FIG. 8B is a perspective view showing the exterior of the cover member according to the example 6.

FIGS. 8A and 8B are perspective views showing the exterior of a cover member according to an example 6. Specifically, FIG. 8A is a view of a cover member 205 according to the example 6 viewed from the front and lower sides. FIG. 8B is a view of the cover member 205 viewed from the rear and lower sides. As shown in FIGS. 8A and 8B, the cover member 205 according to the example 6 is the same as the cover member 204 according to the example 5 in that a projection opening 23 is formed to extend to a slope section 205b in the front of the cover member 205. However, the cover member 205 according to the example 6 is different from the cover member 204 according to the example 5 in that the plane shape of the projection opening 23 is a trapezoidal shape widening toward the front.

In the cover member 205 according to the example 6, the projection opening 23 is formed to extend to the slope section 205b in the front. Therefore, for example, even when the screen SC is set in a (high) position closer to the ceiling plate CL, image light can be projected on the screen SC without being blocked by the cover member 205. Since the projection opening 23 widens toward the front, for example, when the screen SC and the projector 1 are close to each other, even if image light is projected at a wide angle, the image light can be projected on the screen SC without being blocked by the cover member 205.

Example 7

Figure 9A:
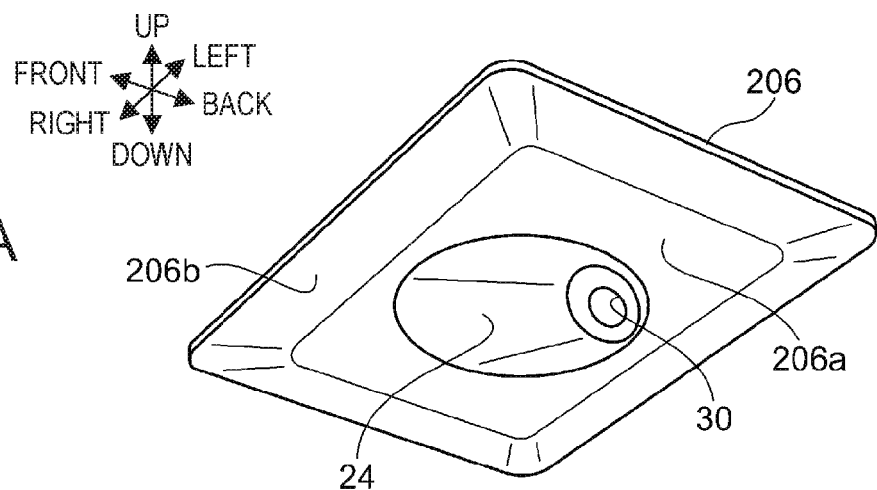
FIG. 9A is a perspective view showing the exterior of a cover member according to an example 7.
Figure 9B:
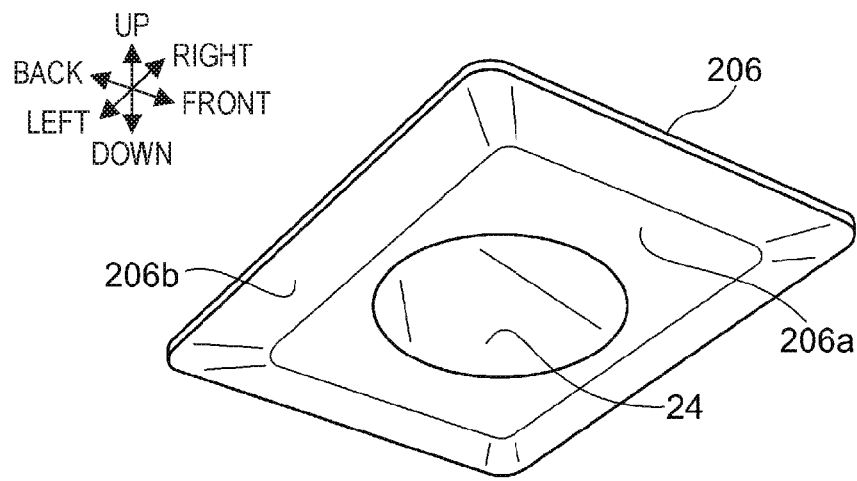
FIG. 9B is a perspective view showing the exterior of the cover member according to the example 7.

FIGS. 9A and 9B are perspective views showing the exterior of a cover member according to an example 7. Specifically, FIG. 9A is a view of a cover member 206 according to the example 7 viewed from the front and lower sides. FIG. 9B is a view of the cover member 206 viewed from the rear and lower sides.

As shown in FIGS. 9A and 9B, the cover member 206 according to the example 7 is the same as the cover member 202 according to the example 3 in that a projection opening 24 is disposed in the center in a plane section 206a of the cover member 206. However, the cover member 206 according to the example 7 is different from the cover member 202 according to the example 3 in that the plane shape of the projection opening 24 is a substantially circular shape. The substantially circular shape includes a circular shape and an elliptical shape.

In the cover member 206 according to the example 7, the projection opening 24 is disposed in the center of the cover member 206. Therefore, a relaxed atmosphere is obtained in appearance. It is possible to give a sense of stability and a sense of security to the person present in the room interior. The plane shape of the projection opening 24 is the substantially circular shape. Therefore, a calm atmosphere is obtained in appearance. It is possible to further give a sense of security to the person present in the room interior.

When the projector 1 is used in a store or the like, for example, as a visual effect for improving the atmosphere in the room interior, image light having a substantially circular shape is sometimes used. When the external shape of image light projected on the screen SC is a substantially circular shape, if the plane shape of the projection opening 24 is a substantially circular shape, it is possible to reduce the external shape of the projection opening 24. Correspondence between the shape of image light and the projection opening is explained below.

When the plane shape of the projection opening 20 is the substantially rectangular shape as in the example 3 and the external shape of the image light projected on the screen SC is the substantially circular shape, the image light having the substantially circular shape is allowed to pass as an inscribed circle of the projection opening 20. Then, the opening area of the rectangular projection opening 20 is large with respect to the external shape of the passing image light. On the other hand, when the plane shape of the projection opening 24 is the substantially circular shape as in the cover member 206 according to the example 7, it is possible to reduce the opening area with respect to the passing substantially circular image light.

Conversely, when the plane shape of the projection opening 24 is a substantially circular shape and the external shape of the image light projected on the screen SC is a rectangular shape, the projection opening 24 needs an opening area forming a circumscribed circle of the image light. Therefore, the opening area with respect to the external shape of the passing image light increases. Therefore, when the external shape of the image light projected on the screen SC is the rectangular shape, the opening area with respect to the external shape of the passing image light can be reduced when the plane shape of the projection opening 20 is the substantially rectangular shape as in the example 3.

Irrespective of the examples, when the external shape of the projected image light is the rectangular shape, the external shape of the projection opening is desirably also the rectangular shape and, when the external shape of the projected image light is the substantially circular shape, the external shape of the projection opening is desirable also the substantially circular shape.

Example 8

Figure 10A:
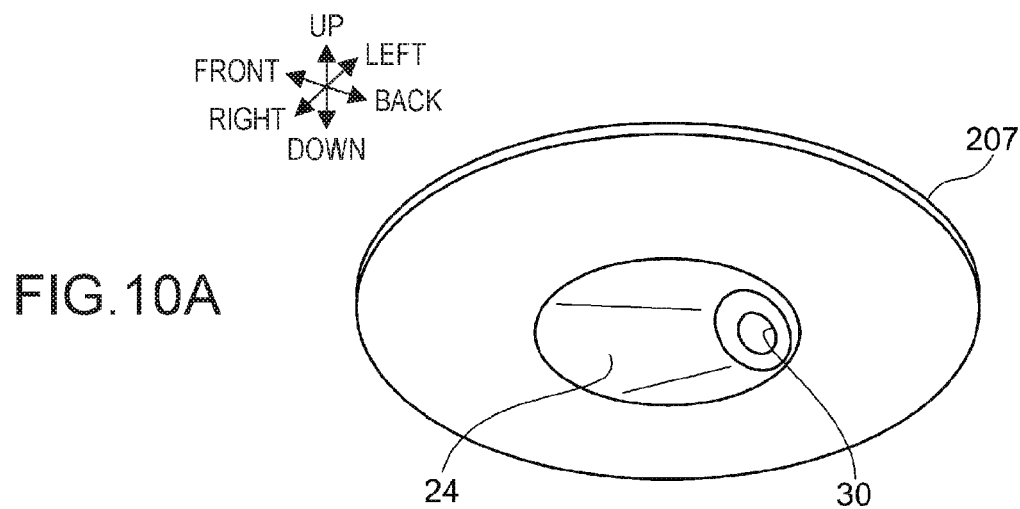
FIG. 10A is a perspective view showing the exterior of a cover member according to an example 8.
Figure 10B:
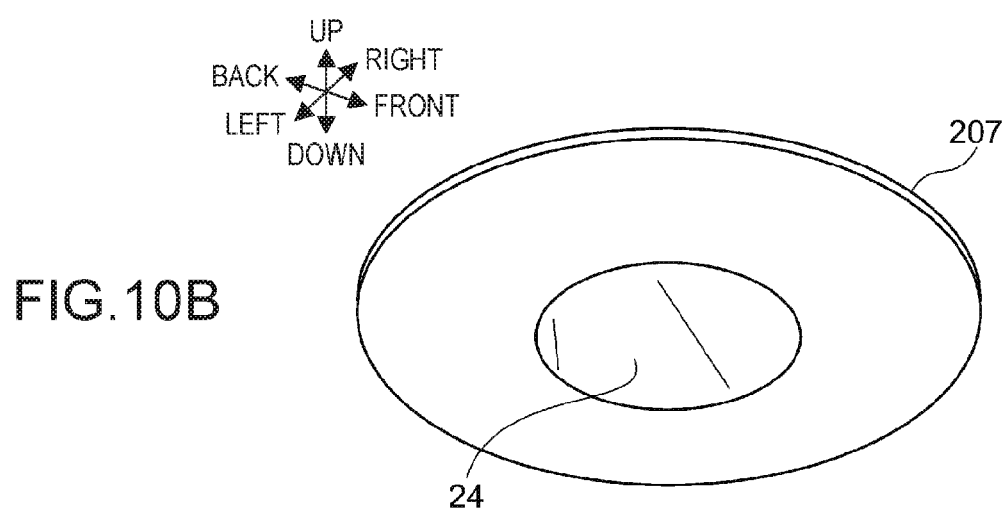
FIG. 10B is a perspective view showing the exterior of the cover member according to the example 8.
Figure 10C:
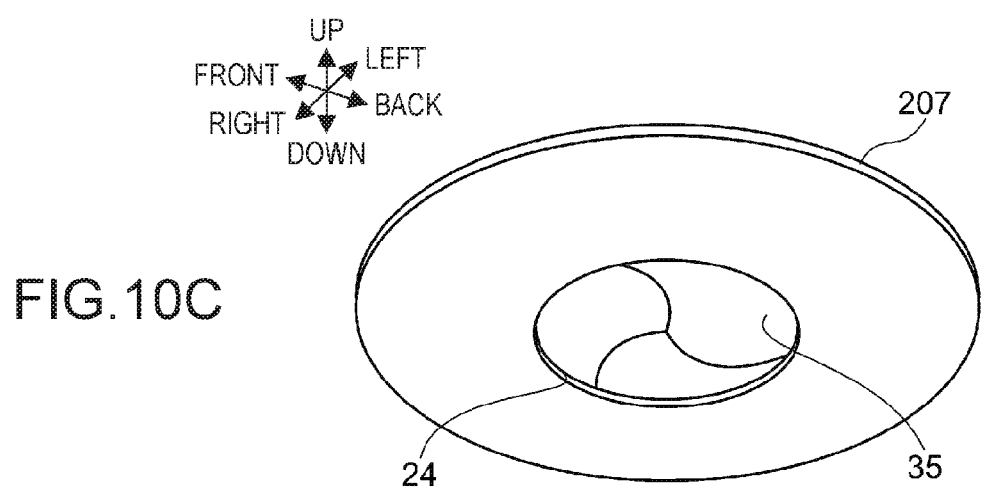
FIG. 10C is a perspective view showing the exterior of the cover member according to the example 8.

FIGS. 10A to 10C are perspective views showing the exterior of a cover member according to an example 8. Specifically, FIGS. 10A and 10C are views of a cover member 207 according to the example 8 viewed from the front and lower sides. FIG. 10B is a view of the cover member 207 viewed from the rear and lower sides.

As shown in FIGS. 10A, 10B, and 10C, the cover member 207 according to the example 8 is different from the cover member 206 according to the example 7 in that the cover member 207 is flat and in that the plane shape of the cover member 207 is a substantially circular shape. The cover member 207 according to the example 8 is the same as the cover member 206 according to the example 7 in that the projection opening 24 is substantially circular and is disposed in the center of the cover member 207. More specifically, the substantially circular projection opening 24 is disposed near the center position of the substantially circular cover member 207. As shown in FIG. 10C, the cover member 207 may include a lid 35 that opens and closes the projection opening 24 by combining a plurality of blades like a leaf shutter used in a camera.

Since the cover member 207 according to the example 8 is flat, a sense of discomfort against the ceiling plate CL is less. Both of the plane shape of the cover member 207 and the plane shape of the projection opening 24 are the substantially circular shape. The substantially circular projection opening 24 is disposed near the center position of the substantially circular cover member 207. Therefore, it is possible to further give a sense of stability and a sense of security to the person present in the room interior. Since the projection opening 24 is closed by the lid 35 during the non-use, adhesion of dust to the projection window 30 is suppressed. The cover member 207 and the lid 35 are visually recognized as if the cover member 207 and the lid 35 are integral in appearance. Therefore, it is possible to more easily adapt the cover member 207 to the atmosphere of the room interior.

Example 9

Figure 11A:
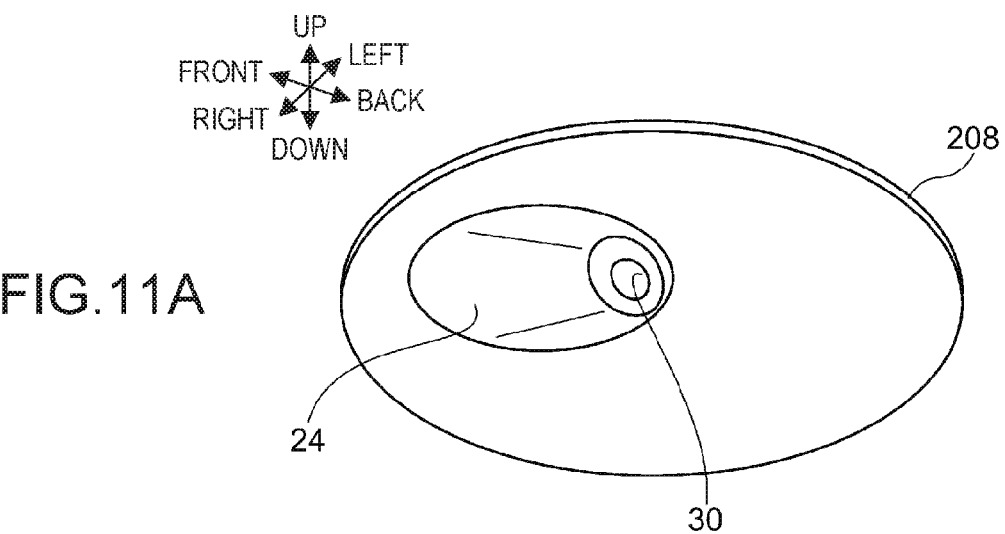
FIG. 11A is a perspective view showing the exterior of a cover member according to an example 9.
Figure 11B:
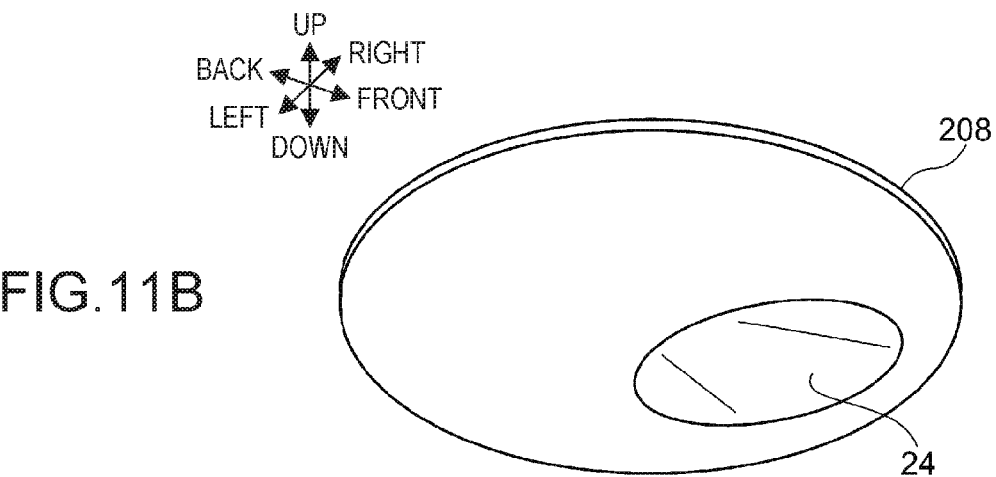
FIG. 11B is a perspective view showing the exterior of the cover member according to the example 9.

FIGS. 11A and 11B are perspective views showing the exterior of a cover member according to an example 9.

Specifically, FIG. 11A is a view of a cover member 208 according to the example 9 viewed from the front and lower sides. FIG. 11B is a view of the cover member 208 viewed from the rear and lower sides.

As shown in FIGS. 11A and 11B, the cover member 208 according to the example 9 is different from the cover member 207 according to the example 8 in that the projection opening 24 is disposed on the front side in the cover member 208. That is, the projection opening 24 is disposed in a position decentered from the center position of the plane shape of the cover member 208.

In the cover member 208 according to the example 9, the projection opening 24 is disposed in the position decentered from the center position of the plane shape of the cover member 208. Therefore, compared with the example 8 in which the projection opening 24 is disposed in the center position of the plane shape of the cover member 207, the person can experience a dynamic feeling. It is possible to produce a modern atmosphere in the room interior.

Example 10

Figure 12A:
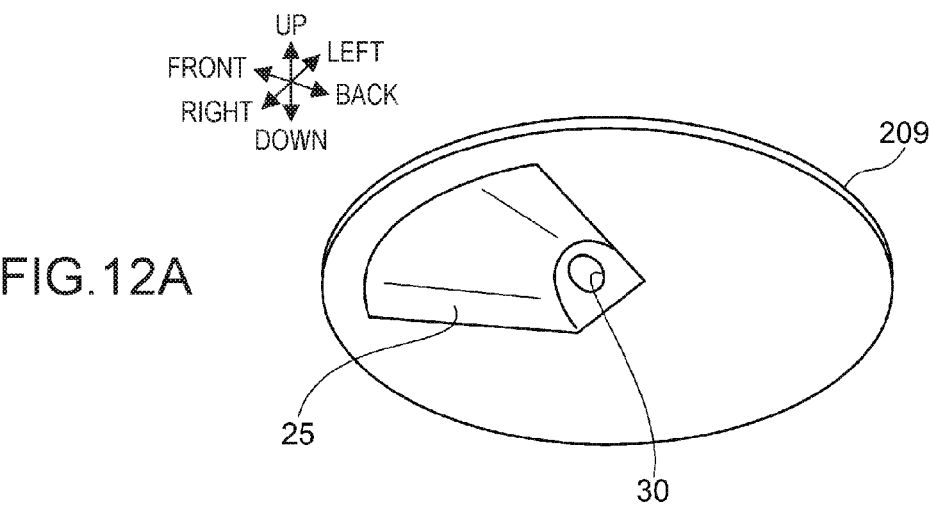
FIG. 12A is a perspective view showing the exterior of a cover member according to an example 10.
Figure 12B:
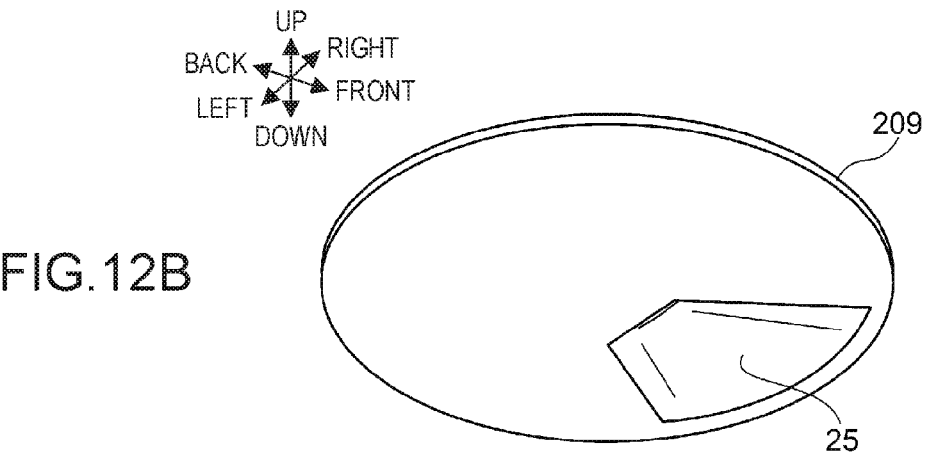
FIG. 12B is a perspective view showing the exterior of the cover member according to the example 10.

FIGS. 12A and 12B are perspective views showing the exterior of a cover member according to an example 10. Specifically, FIG. 12A is a view of a cover member 209 according to the example 10 viewed from the front and lower sides. FIG. 12B is a view of the cover member 209 viewed from the rear and lower sides.

As shown in FIGS. 12A and 12B, the cover member 209 according to the example 10 is different from the cover member 208 according to the example 9 in that the plane shape of a projection opening 25 is a fan shape widening toward the front. In other words, the plane shape of the projection opening 25 a substantially trapezoidal shape, the upper bottom side of which is located in the center of the cover member 209 and the lower bottom side of which is located on the front side of the cover member 209. The outer peripheral side (the lower bottom side) is formed in an arcuate shape conforming to the outer periphery of the cover member 209.

In the cover member 209 according to the example 10, the projection opening 25 widens toward the front. Therefore, for example, when the screen SC and the projector 1 are close to each other, even if image light is projected at a wide angle, the image light can be projected on the screen SC without being blocked by the cover member 209. Since the outer peripheral side of the projection opening 25 is formed in the arcuate shape conforming to the outer periphery of the cover member 209, it is possible to reduce a sense of discomfort.

Example 11

Figure 13A:
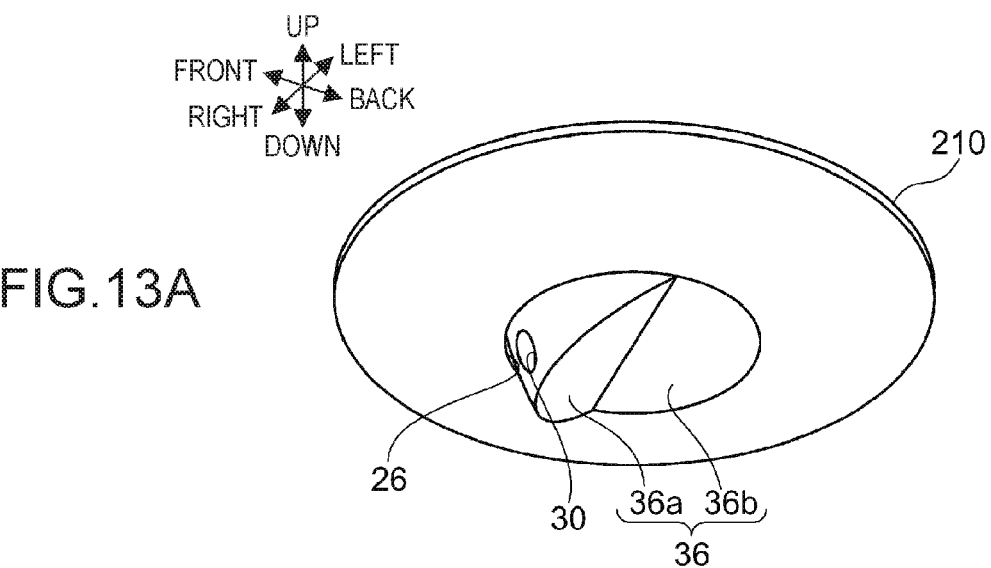
FIG. 13A is a perspective view showing the exterior of a cover member according to an example 11.
Figure 13B:
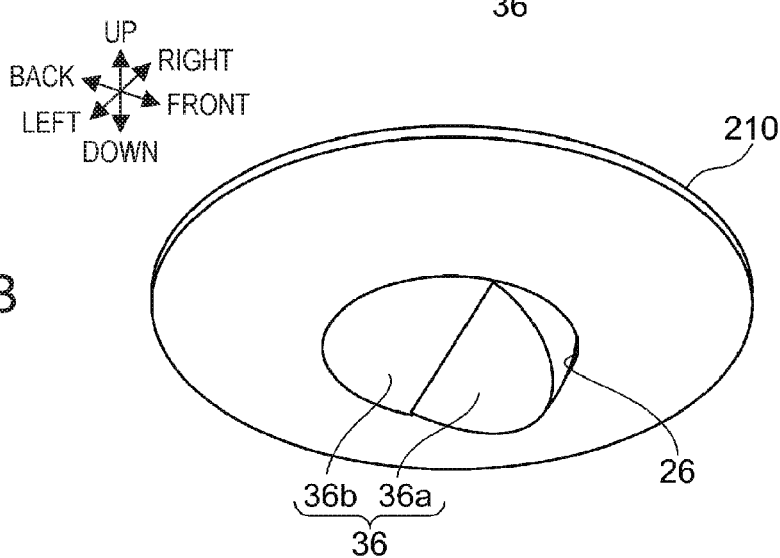
FIG. 13B is a perspective view showing the exterior of the cover member according to the example 11.
Figure 13C:
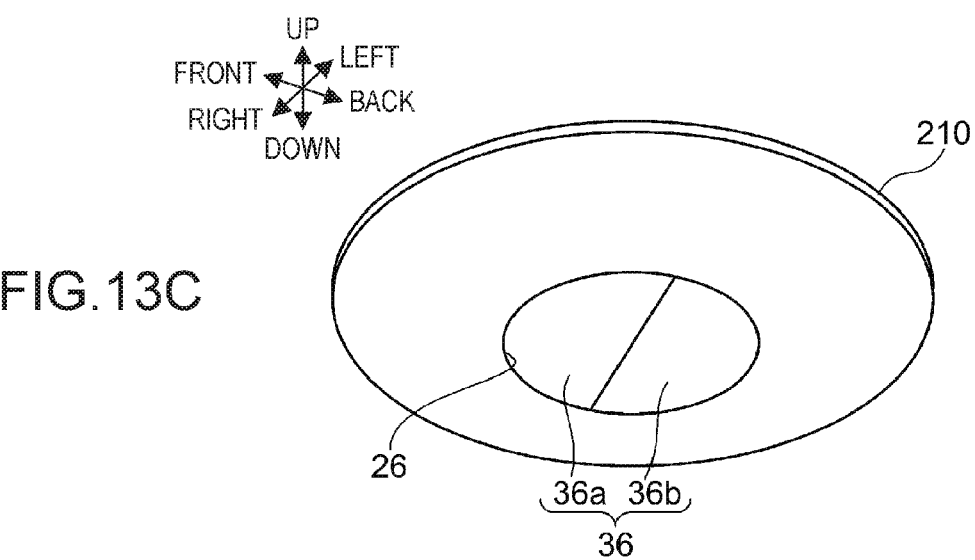
FIG. 13C is a perspective view showing the exterior of the cover member according to the example 11.

FIGS. 13A to 13C are perspective views showing the exterior of a cover member according to an example 11. Specifically, FIGS. 13A and 13C are views of a cover member 210 according to the example 11 viewed from the front and lower sides. FIG. 13B is a view of the cover member 210 viewed from the rear and lower sides. As shown in FIGS. 13A to 13C, the cover member 210 according to the example 11 is different from the cover member 207 according to the example 8 in that the cover member 210 has a structure in which a part of a lid 36 that covers a projection opening 26 during the non-use moves to the lower side during the use and the projection window 30 is exposed.

In the cover member 210 according to the example 11, the lid 36 is configured by a movable section 36a and a fixed section 36b, both of which have a semicircular shape. The fixed section 36b is disposed on the rear side of the projection opening 26 and closes a half on the rear side of an opening section of the projection opening 26 during the use and during the non-use of the projector 1. The movable section 36a is disposed on the front side of the projection opening 26 and closes a half on the front side of the opening section of the projection opening 26 during the non-use of the projector 1.

During the use of the projector 1, an arcuate side (the front side) of a semicircle of the movable section 36a turns to the lower side about a turning axis set on a linear portion side of the semicircle. Consequently, the projection window 30 is exposed to the lower side of the cover member 210 in a state in which the projection window 30 tilts with respect to the ceiling plate CL. Therefore, it is possible to project image light on the front side and the lower side. In a state in which the movable section 36a closes a half on the front side of the opening section of the projection opening 26 during the non-use, the projection window 30 is disposed further on the upper side than the cover member 210 (the ceiling plate CL).

In the cover member 210 according to the example 11, as in the cover member 207 according to the example 8, since the projection opening 26 is closed by the lid 36 during the non-use, adhesion of dust to the projection window 30 is suppressed. The cover member 210 and the lid 36 are visually recognized as if the cover member 210 and the lid 36 are integral in appearance. Therefore, it is possible to more easily adapt the cover member 210 to the atmosphere of the room interior.

Second Embodiment

Configuration of a Projector

Figure 14:
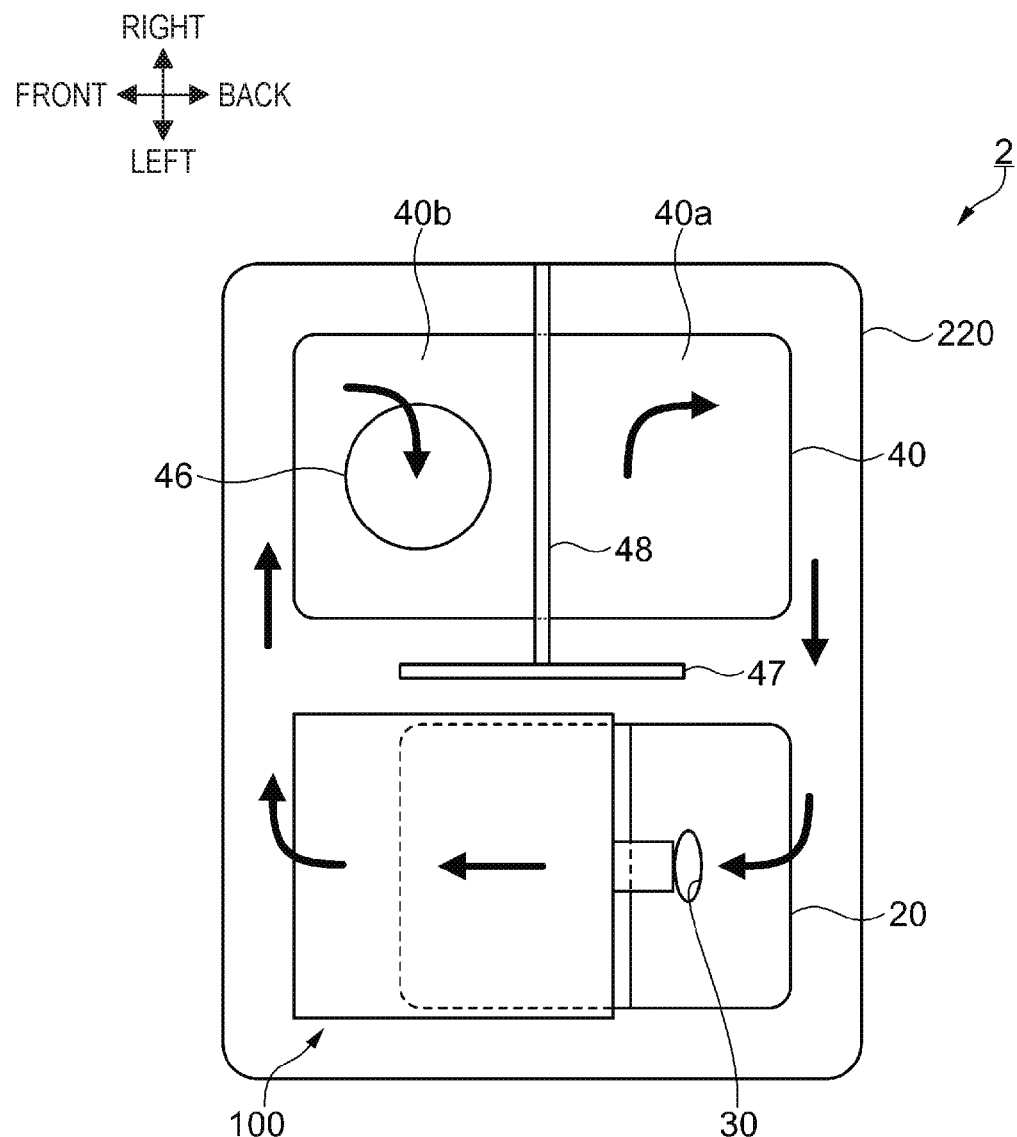
FIG. 14 is a schematic diagram showing the configuration of a main part of a projector according to a second embodiment.

The configuration of a projector according to a second embodiment is explained with reference to FIG. 14. FIG. 14 is a schematic diagram showing the configuration of a main part of the projector according to the second embodiment. Specifically, FIG. 14 is a schematic plan view of the projector according to the second embodiment viewed from the upper side (the main ceiling RF side shown in FIG. 1). In FIG. 14, illustration of a fixed member is omitted.

A projector 2 according to the second embodiment is different from the projector 1 according to the first embodiment in that a vent hole is formed in a cover member. Concerning the configuration of the projector 2 according to the second embodiment, differences from the first embodiment are explained. Components same as the components in the first embodiment are denoted by the same reference numerals and signs and explanation of the components is omitted.

As shown in FIG. 14, the projector 2 according to the second embodiment includes the projector main body 100, a fixed member (not shown in the figure), a cover member 220, the projection window 30, and the cooling fan 46 functioning as a cooling section. The cover member 220 includes the projection opening 20 and a vent hole 40 functioning as an opening section for performing intake and exhaust for cooling.

A partition plate 47 extending along the front-back direction is disposed between the projection opening 20 and the vent hole 40 arranged in the left-right direction. The length of the partition plate 47 is, for example, shorter than the length in the front-back direction of the projection opening 20 and the vent hole 40. The partition plate 47 enables the air to flow further on the front side and the rear side than the partition plate 47 while partitioning the projection opening 20 and the vent hole 40.

A partition wall 48 extending long the left-right direction is disposed substantially in the center in the front-back direction of the vent hole 40. The partition plate 48 has, for example, length reaching from the right side end portion of the cover member 220 to the partition plate 47. The partition plate 48 partitions a region of the vent hole 40 into a substantially half on each of the front side and the rear side. The rear side partitioned by the partition wall 48 is an intake port 40*a*. The front side partitioned by the partition wall 48 is an exhaust port 40*b*. The partition wall 48 suppresses a flow of the air between the intake port 40*a* and the exhaust port 40*b*.

Note that the partition plate 47 and the partition plate 48 may be provided in the cover member 220 or may be provided in a not-shown fixed member. One or both of the partition plate 47 and the partition plate 48 do not have to be provided. The cooling fan 46 is disposed on, for example, the exhaust port 40*b* side. In FIG. 14, a flow of the air on the inside of the projector 2 is indicated by arrows.

The air in the room interior is sucked from the intake port 40*a* to the upper side of the cover member 220. Since the partition plate 48 is present between the intake port 40*a* and the exhaust port 40*b*, the air sucked from the intake port 40*a* flows to the projection opening 20 rather than to the exhaust port 40*b* side. The air sucked from the intake port 40*a* cools the projector main body 100. Heat emitted from the projector main body 100 flows to the exhaust port 40*b* and is discharged from the exhaust port 40*b* to the room interior side by the cooling fan 46. The suction from the intake port 40*a* and the flow of the air are facilitated by the exhaust from the cooling fan 46.

Note that the cooling fan 46 may be disposed on the intake port 40*a* side or may be disposed on both of the exhaust port 40*b* and the intake port 40*a*. Even if the cooling fan 46 is not disposed in both of the exhaust port 40*b* and the suction port 40*a*, the projector main body 100 can be naturally cooled by the intake port 40*a* and the exhaust port 40*b*. Further, the intake port 40*a* may be disposed on the front side and the exhaust port 40*b* may be disposed on the rear side.

In the projector 2 according to the second embodiment, the projector main body 100 is cooled using the air in an indoor space. With the configuration of the projector 2 according to the second embodiment, the heat emitted from the projector main body 100 less easily accumulate in a space in an attic. Therefore, for example, when air tightness of a building in which the projector 2 is set is high and aeration (ventilation) between a space in an attic and the outside of the building (the outdoor air) is insufficient, it is possible to cool the projector main body 100 using the air in the indoor space.

Example of the Cover Member

Examples of the cover member according to the second embodiment are explained below.

Example 12

Figure 15A:
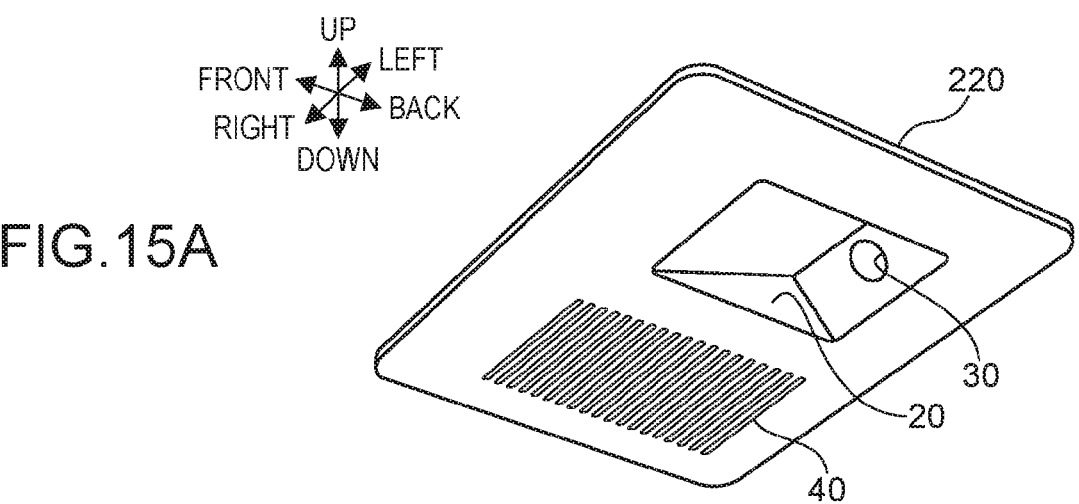
FIG. 15A is a perspective view showing the exterior of a cover member according to an example 12.
Figure 15B:
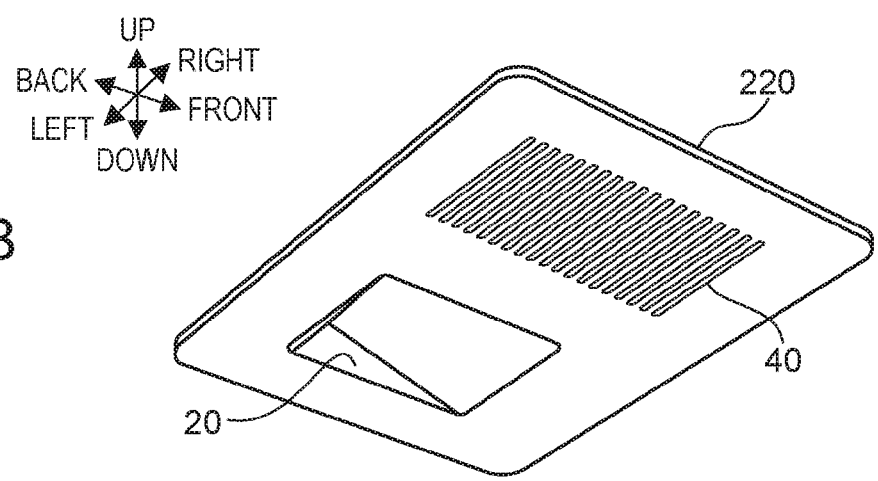
FIG. 15B is a perspective view showing the exterior of the cover member according to the example 12.

FIGS. 15A and 15B are perspective views showing the exterior of a cover member according to an example 12. Specifically, FIG. 15A is a view of the cover member 220 according to the example 12 viewed from the front and lower sides. FIG. 15B is a view of the cover member 220 viewed from the rear and lower sides.

As shown in FIGS. 15A and 15B, the plane shape of the cover member 220 according to the example 12 is a sub-stantially rectangular flat shape. On the left side of the cover member 220, as in the cover member 200 according to the example 1, the projection opening 20, the plane shape of which is the substantially rectangular shape, provided with the projection window 30 is disposed. The vent hole 40, the contour of which is substantially rectangular, is disposed on the right side of the projection opening 20. In the cover member 220 according to the example 12, the vent hole 40 is configured by a plurality of groove-like opening sections.

Example 13

Figure 16A:
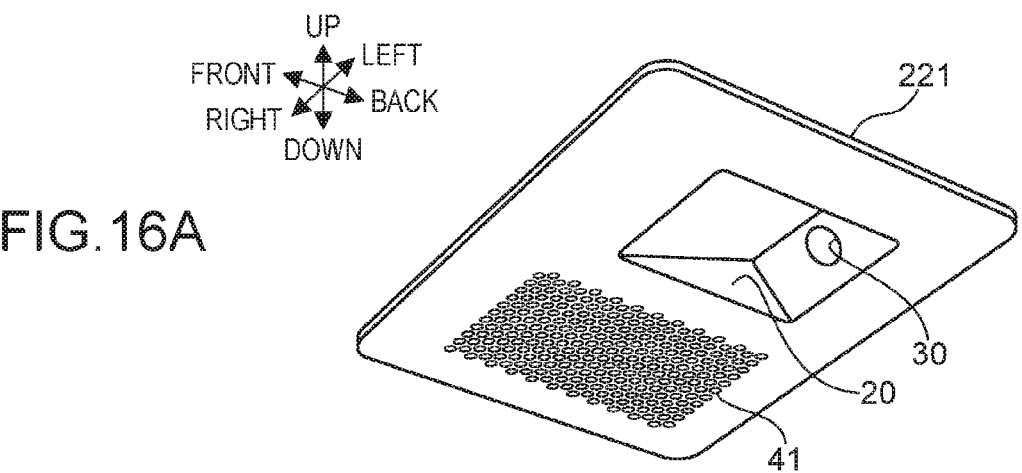
FIG. 16A is a perspective view showing the exterior of a cover member according to an example 13.
Figure 16B:
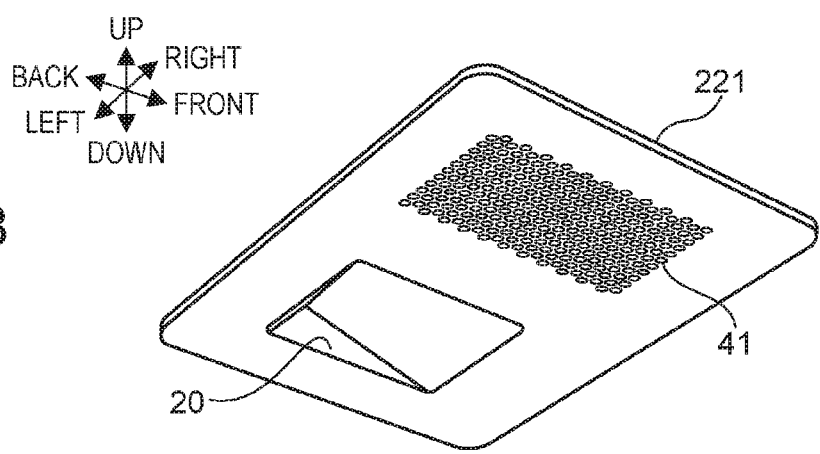
FIG. 16B is a perspective view showing the exterior of the cover member according to the example 13.

FIGS. 16A and 16B are perspective views showing the exterior of a cover member according to an example 13. Specifically, FIG. 16A is a view of a cover member 221 according to the example 13 viewed from the front and lower sides. FIG. 16B is a view of the cover member 221 viewed from the rear and lower sides. As shown in FIGS. 16A and 16B, the cover member 221 according to the example 13 is different from the cover member 220 according to the example 12 in that a vent hole 41 is configured by a plurality of round hole-like opening sections.

Example 14

Figure 17A:
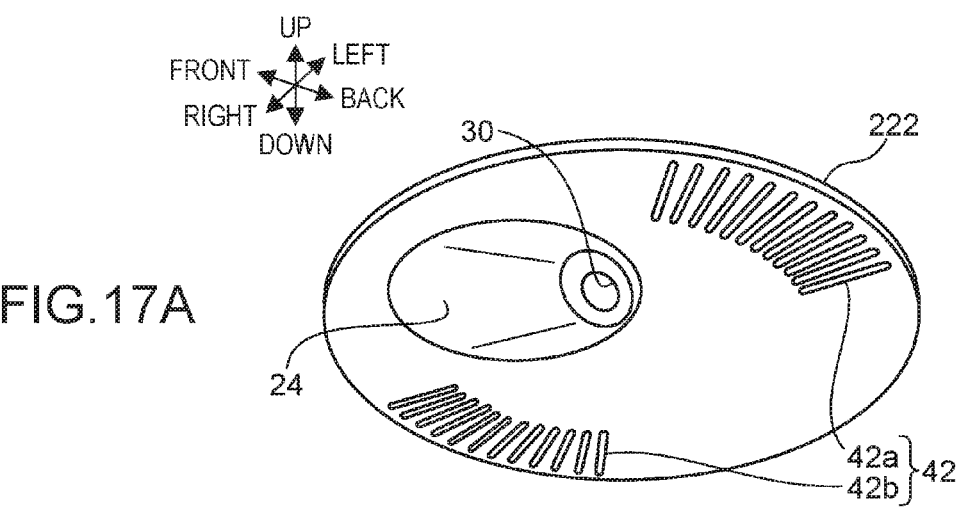
FIG. 17A is a perspective view showing the exterior of a cover member according to an example 14.
Figure 17B:
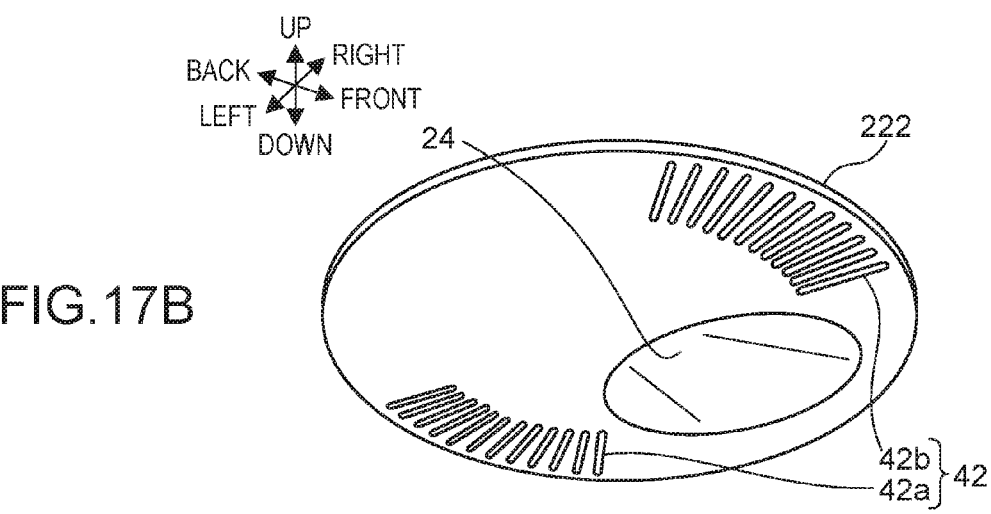
FIG. 17B is a perspective view showing the exterior of the cover member according to the example 14.

FIGS. 17A and 17B are perspective views showing the exterior of a cover member according to an example 14. Specifically, FIG. 17A is a view of a cover member 222 according to the example 14 viewed from the front and lower sides. FIG. 17B is a view of the cover member 222 viewed from the rear and lower sides.

As shown in FIGS. 17A and 17B, like the cover member 208 according to the example 9, the cover member 222 according to the example 14 is a flat plate having a substantially circular plane shape. In the cover member 222, the projection opening 24 having a substantially circular plane shape is disposed on the front side. The cover member 222 according to the example 14 is different from the cover member 208 according to the example 9 in that a vent hole 42 including an intake port 42*a* and an exhaust port 42*b* is provided.

In the cover member 222, for example, the intake port 42*a* is disposed on the left side and the exhaust port 42*b* is disposed on the right side. The intake port 42*a* may be disposed on the right side. The exhaust port 42*b* may be disposed on the left side. The intake port 42*a* and the exhaust port 42*b* are configured by pluralities of groove-like opening sections. The groove-like opening sections of the intake port 42*a* and the exhaust port 42*b* are formed in a radial shape centering on the center position of the plane shape of the cover member 222.

Note that, in the cover member 222 according to the example 14, as opposed to the example 12 and the example 13, the intake port 42*a* and the exhaust port 42*b* are disposed to be divided on both the left and right sides of the projector main body 100 (see FIG. 1).

Example 15

Figure 18A:
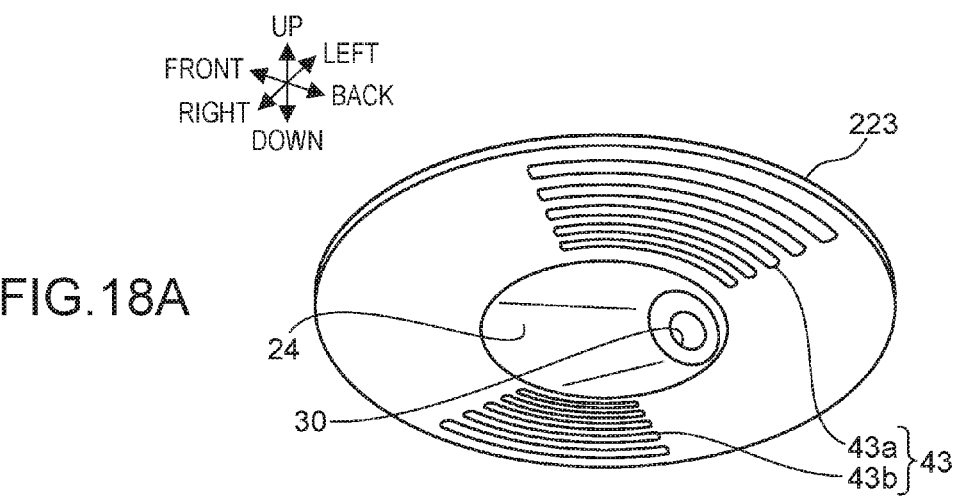
FIG. 18A is a perspective view showing the exterior of a cover member according to an example 15.
Figure 18B:
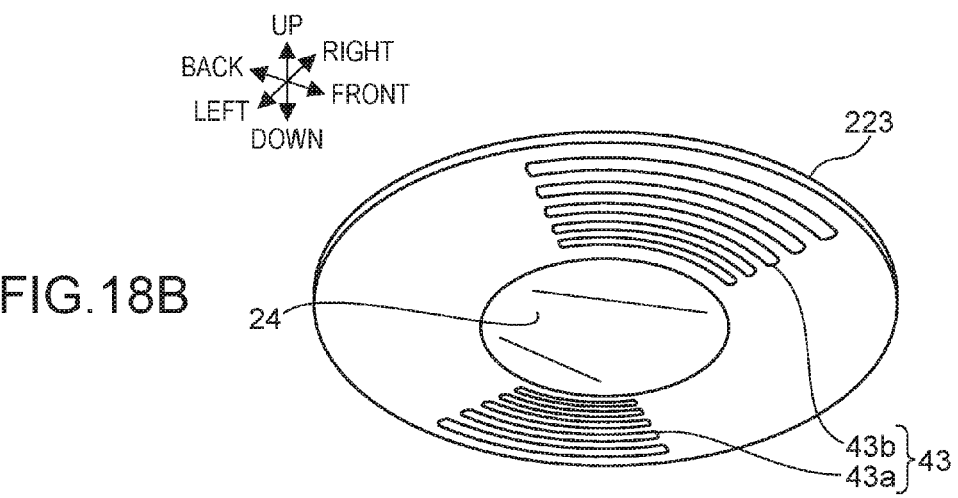
FIG. 18B is a perspective view showing the exterior of the cover member according to the example 15.

FIGS. 18A and 18B are perspective views showing the exterior of a cover member according to an example 15. Specifically, FIG. 18A is a view of a cover member 223 according to the example 15 viewed from the front and lower sides. FIG. 18B is a view of the cover member 223 viewed from the rear and lower sides.

As shown in FIGS. 18A and 18B, the cover member 223 according to the example 15 is different from the cover member 222 according to the example 14 in that the projection opening 24 is disposed in the center of the cover member 223 and in that pluralities of groove-like opening sections configuring a vent hole 43 (an intake port 43a and an exhaust port 43b) are formed in a concentric arcuate shape centering on the plane shape of the cover member 223.

Example 16

Figure 19A:
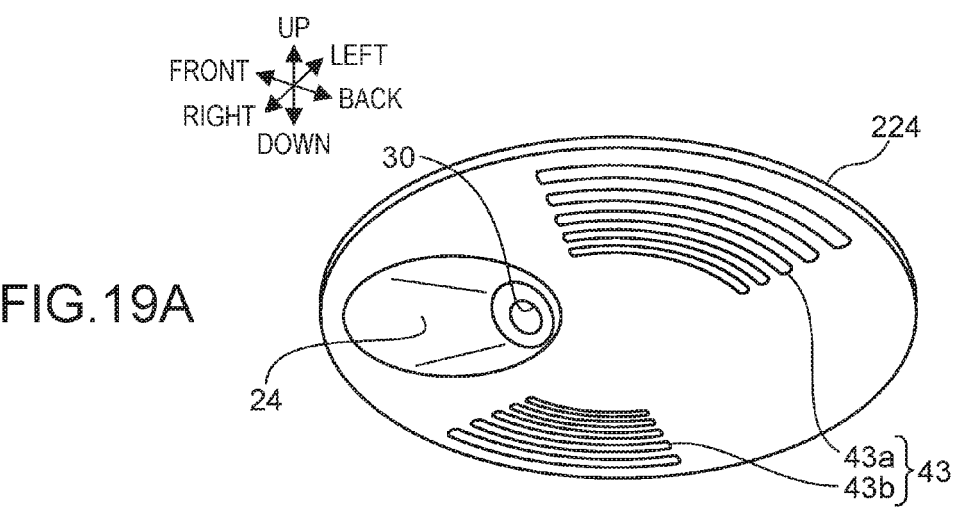
FIG. 19A is a perspective view showing the exterior of a cover member according to an example 16.
Figure 19B:
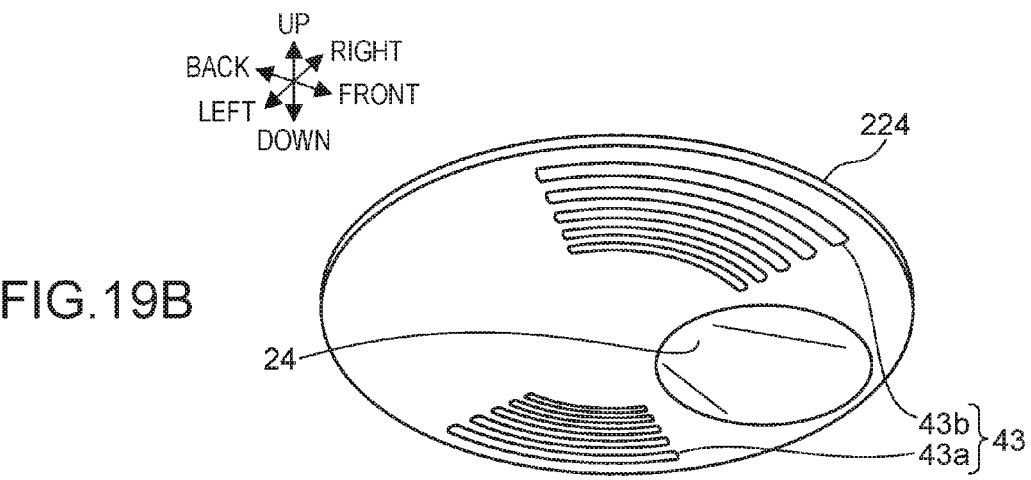
FIG. 19B is a perspective view showing the exterior of the cover member according to the example 16.

FIGS. 19A and 19B are perspective views showing the exterior of a cover member according to an example 16. Specifically, FIG. 19A is a view of a cover member 224 according to the example 16 viewed from the front and lower sides. FIG. 19B is a view of the cover member 224 viewed from the rear and lower sides. As shown in FIGS. 19A and 19B, the cover member 224 according to the example 16 is different from the cover member 223 according to the example 15 in that the projection opening 24 is disposed on the front side.

Example 17

Figure 20A:
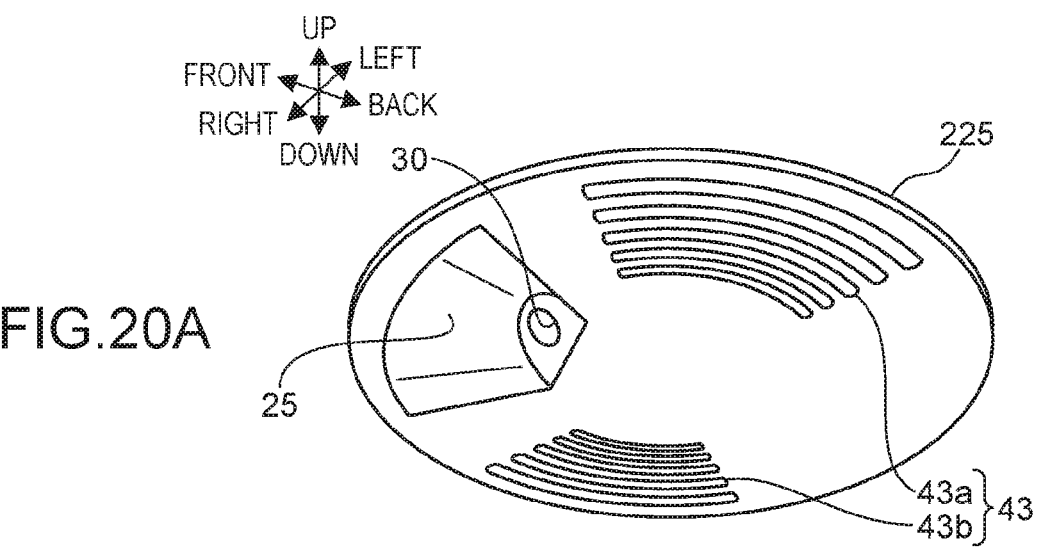
FIG. 20A is a perspective view showing the exterior of a cover member according to an example 17.
Figure 20B:
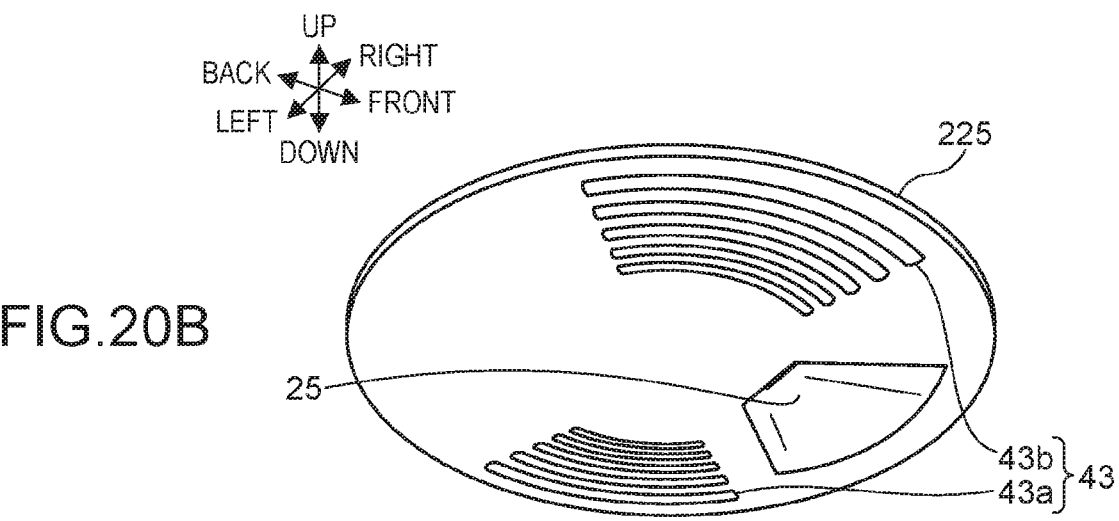
FIG. 20B is a perspective view showing the exterior of the cover member according to the example 17.

FIGS. 20A and 20B are perspective views showing the exterior of a cover member according to an example 17. Specifically, FIG. 20A is a view of a cover member 225 according to the example 17 viewed from the front and lower sides. FIG. 20B is a view of the cover member 225 viewed from the rear and lower sides. As shown in FIGS. 20A and 20B, the cover member 225 according to the example 17 is different from the cover member 224 according to the example 16 in that the plane shape of the projection opening 25 is a fan shape widening toward the front.

Third Embodiment

Configuration of a Projector

Figure 21A:
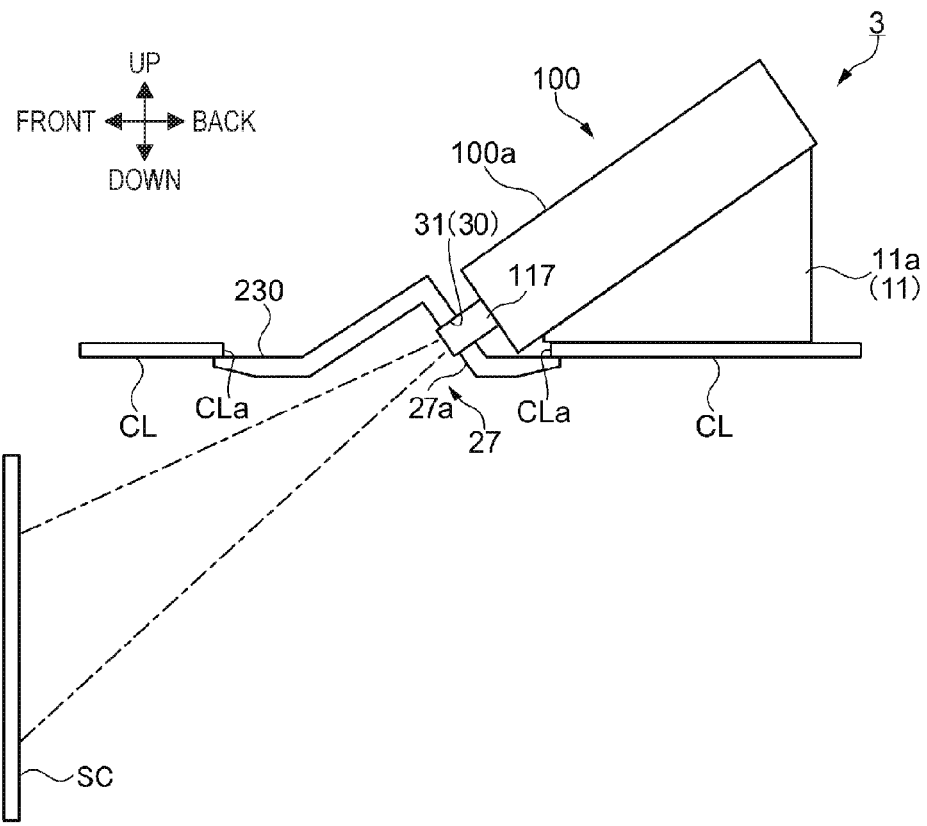
FIG. 21A is a schematic diagram showing the configuration of a main part of a projector according to a third embodiment.
Figure 21B:
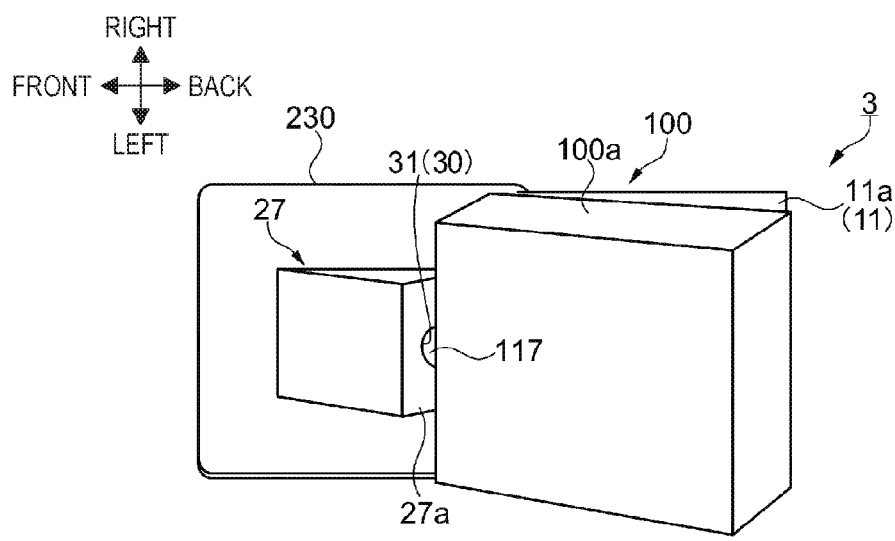
FIG. 21B is a schematic diagram showing the configuration of the main part of the projector according to the third embodiment.

The configuration of a projector according to a third embodiment is explained with reference to FIGS. 21A and 21B. FIGS. 21A and 21B are schematic diagrams showing the configuration of a main part of the projector according to the third embodiment. Specifically, FIG. 21A is a view of a projector 3 according to the third embodiment viewed from the left lateral direction (the left side). FIG. 21B is a view of the projector 3 according to the third embodiment obliquely viewed from the upper side (the main ceiling side). Note that, in FIG. 21A, illustration of a main ceiling and suspension bars is omitted. Further, in FIG. 21B, illustration of the ceiling plate CL is omitted.

The projector 3 according to the third embodiment is different from the projectors 1 and 2 according to the embodiments explained above in that the projector 3 does not include the reflecting mirror 33 and image light is directly projected on the screen SC from the projector main body 100. Concerning the configuration of the projector 3 according to the third embodiment, differences from the embodiments are explained. Components same as the components in the embodiments are denoted by the same reference numerals and signs and explanation of the components is omitted.

As shown in FIGS. 21A and 21B, the projector 3 according to the third embodiment includes the projector main body 100, a fixed member 11, and a cover member 230 provided with the projection window 30. The fixed member 11 includes a fixed table 11a.

In the projector 3 according to the third embodiment, image light is directly projected on the screen SC set further on the lower side than the ceiling plate CL from the projector main body 100 set in a space above the ceiling plate CL (an attic). Accordingly, the projector main body 100 is disposed to tilt downward. Therefore, for example, the cross section of the fixed table 11a of the fixed member 11 on which the projector main body 100 is placed is triangular. A surface of the fixed table 11a on which the projector main body 100 is placed is a slope.

The cover member 230 includes a projection opening 27 functioning as a recessed section. The projection window 30 is provided in a slope 27a on the rear side of the projection opening 27. In the example shown in FIGS. 21A and 21B, the projection window 30 includes the opening section 31. However, the transparent plate 32 is not disposed in the opening section 31. The projection lens 117 of the projector main body 100 disposed to tile downward is inserted into the opening section 31 of the projection window 30. Consequently, the image light is directly projected on the screen SC from the projection lens 117.

Note that, as in the embodiments explained above, the transparent plate 32 (or the lens) may be disposed in the opening section 31 of the projection window 30. When such a configuration is adopted, the projector main body 100 is disposed such that the projection lens 117 is slight apart from the projection window 30 to the rear side and the upper side of the projection window 30. The image light projected from the projection lens 117 is transmitted through the transparent plate 32 (or the lens) of the projection window 30 and projected on the screen SC.

Examples of the Cover Member

The configurations of the example 1 to the example 17 of the embodiments explained above can be applied to the projector 3 according to the third embodiment as the configuration of the cover member 230. However, in the case of the configuration of the cover member 210 (see FIGS. 13A to 13C) according to the example 11, since the movable section 36a of the lid 36 turns together with the projection window 30, the projection lens 117 cannot be inserted into the projection window 30. Therefore, when the configuration of the cover member 210 according to the example 11 is applied, the projector main body 100 needs to be disposed such that the projection lens 117 is away from the projection window 30 to the rear side and the upper side.

Fourth Embodiment

Configuration of a Projector

The configuration of a projector according to a fourth embodiment is explained. The projector according to the fourth embodiment is different from the projectors in the embodiments explained above in that at least a part including the projection lens 117 in the projector main body 100 is disposed further on the lower side than the ceiling plate CL during use. That is, in the embodiments, the projector main body 100 is disposed further on the upper side than the ceiling plate CL both during the non-use and during the use. On the other hand, in the fourth embodiment, the projector main body 100 is disposed further on the upper side than the ceiling plate CL during the non-use. At least a part of the projector main body 100 is disposed further on the lower side than the ceiling plate CL during the use.

Like the projector 3 according to the third embodiment, the projector according to the fourth embodiment does not include the reflecting mirror 33. Image light is directly projected on the screen SC from the projection lens 117 of the projector main body 100.

In the fourth embodiment, the configuration of the projector is different in each of examples. Therefore, the configuration of the projector and the configuration of the cover member are individually explained with reference to examples below. In the following explanation, differences from the embodiments are explained. Components same as the components in the embodiments in the drawings referred to blow are denoted by the same reference numerals and signs and explanation of the components is omitted.

Example 18

Figure 22A:
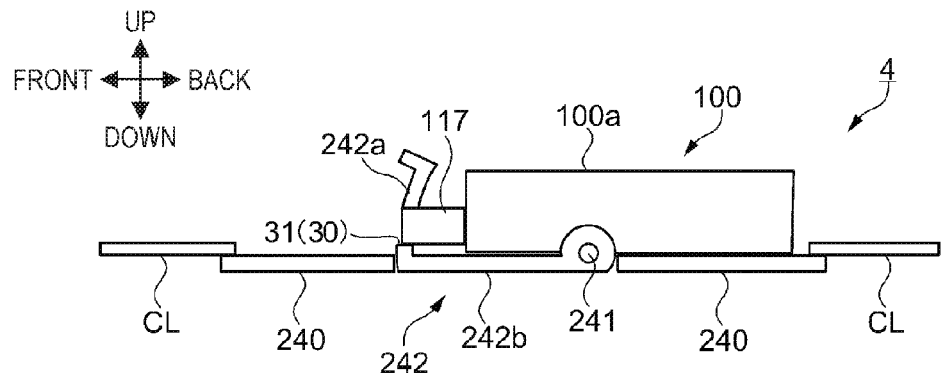
FIG. 22A is a schematic diagram showing the configuration of a main part of a projector according to an example 18 of a fourth embodiment.
Figure 22B:
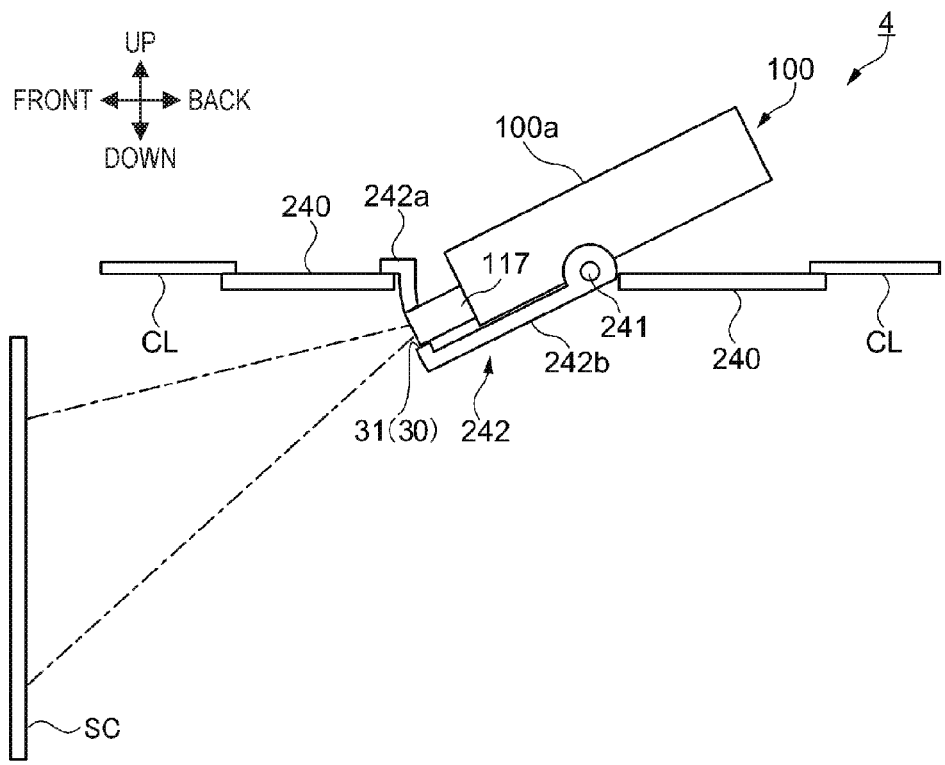
FIG. 22B is a schematic diagram showing the configuration of the main part of the projector according to the example 18 of the fourth embodiment.

FIGS. 22A and 22B are schematic diagrams showing the configuration of a main part of a projector according to an example 18 of the fourth embodiment. Specifically, FIG. 22A is a view of a projector 4 according to the example 18 viewed from the left lateral direction (the left side) during the non-use. FIG. 22B is a view of the projector 4 according to the example 18 viewed from the left lateral direction (the left side) during the use. Note that, in FIGS. 22A and 22B, illustration of a main ceiling and suspension bars is omitted.

As shown in FIG. 22A, the projector 4 according to the example 18 includes the projector main body 100 and a cover member 240. The cover member 240 includes a movable lid 242. The movable lid 242 is turnably supported by a turning shaft 241 set in the cover member 240. The movable lid 242 includes a front section 242a disposed on the front side and a bottom section 242b disposed on the lower side. The projection window 30 including the opening section 31 is provided in the front section 242a.

The projector main body 100 is fixed to the movable lid 242. More specifically, the housing 100a is placed on and fixed to the movable lid 242. The projection lens 117 is inserted into the opening section 31 of the projection window 30. The projector main body 100 may be fixed to the movable lid 242 via a fixed member separate from the movable lid 242. During the non-use, the movable lid 242 is disposed such that the bottom section 242b is substantially parallel to the cover member 240. Therefore, the projector main body 100 placed on the movable lid 242 is disposed substantially in parallel to the cover member 240 on the upper side of cover member 240 (the ceiling plate CL).

As shown in FIG. 22B, during the use, the movable lid 242 turns to the lower side about the turning shaft 241. Consequently, the bottom section 242b inclines to the front side. The front section 242a is disposed on the lower side of the cover member 240. Therefore, the projector main body 100 placed on the movable lid 242 also inclines to the front side. The projection lens 117 inserted into the opening section 31 of the projection window 30 is disposed on the lower side of the cover member 240 (the ceiling plate CL). Consequently, it is possible to project image light toward the screen SC set on the front side and the lower side of the projector 4.

Figure 23A:
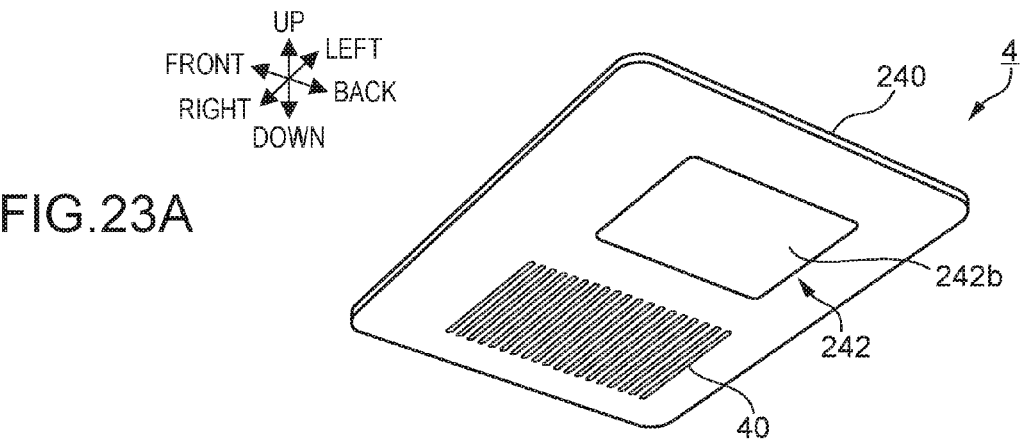
FIG. 23A is a perspective view showing the exterior of a cover member according to an example 18.
Figure 23B:
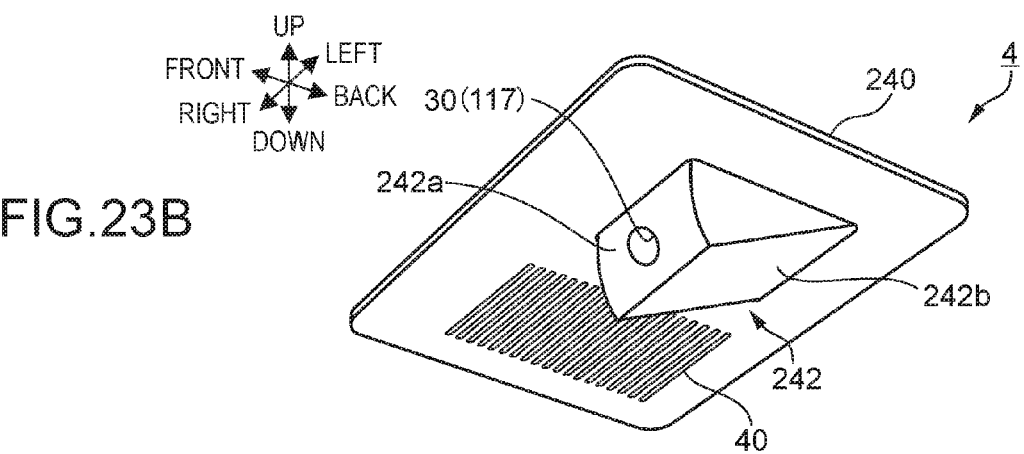
FIG. 23B is a perspective view showing the exterior of the cover member according to the example 18.
Figure 23C:
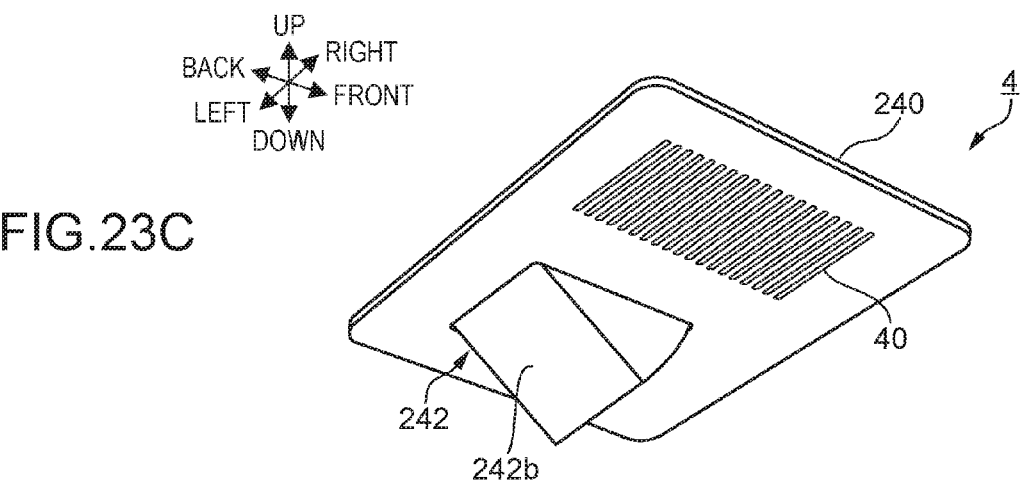
FIG. 23C is a perspective view showing the exterior of the cover member according to the example 18.

FIGS. 23A to 23C are perspective views showing the exterior of the cover member according to the example 18. Specifically, FIG. 23A is a view of the cover member 240 according to the example 18 during the non-use viewed from the front and lower sides. FIG. 23B is a view of the cover member 240 during the use viewed from the front and lower sides. FIG. 23C is a view of the cover member 240 during the use viewed from the rear and lower sides.

As shown in FIG. 23A, during the non-use, the cover member 240 and the movable lid 242 (the bottom section 242b) are visually recognize as being flush with each other. Therefore, it is possible to make the cover member 240 less conspicuous. In the cover member 240, as in the cover member 220 according to the example 12, the vent hole 40 configured by the plurality of groove-like opening sections is disposed on the right side of the movable lid 242. Therefore, it is possible to cool the projector main body 100 using the air in the indoor space.

Note that, in the example 18, the vent hole 41 configured by the plurality of round hole-like opening sections may be disposed as in the cover member 221 according to the example 13. The vent hole 40 does not have to be provided.

As shown in FIGS. 23B and 23C, during the use, the movable lid 242 (the bottom section 242b) inclines to the front side. The front section 242a is disposed on the lower side of the cover member 240. Consequently, the projection lens 117 inserted into the projection window 30 is disposed on the lower side of the cover member 240 (the ceiling plate CL). It is possible to project the image light.

Example 19

Figure 24A:
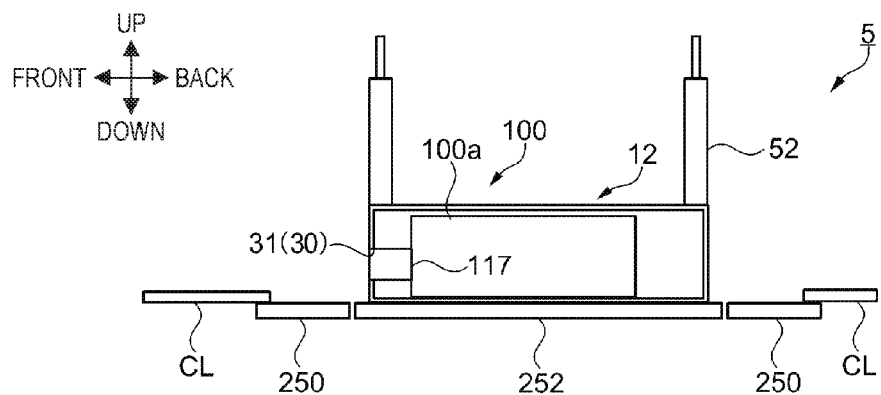
FIG. 24A is a schematic diagram showing the configuration of a main part of a projector according to an example 19 of the fourth embodiment.
Figure 24B:
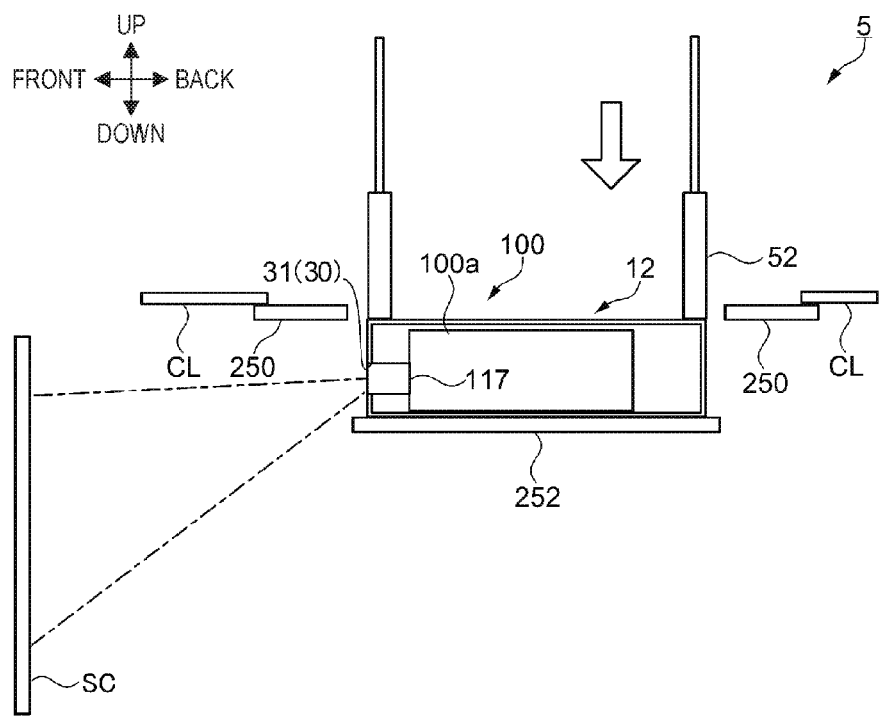
FIG. 24B is a schematic diagram showing the configuration of the main part of the projector according to the example 19 of the fourth embodiment.

FIGS. 24A and 24B are schematic diagrams showing the configuration of the main part of a projector according to an example 19 of the fourth embodiment. Specifically, FIG. 24A is a view of a projector 5 according to the example 19 viewed from the left lateral direction (the left side) during the non-use. FIG. 24B is a view of the projector 5 viewed from the left lateral direction (the left side) during the use.

As shown in FIG. 24A, the projector 5 according to the example 19 includes the projector main body 100 and a cover member 250. The cover member 250 includes a movable lid 252. A fixed member 12 is fixed on the movable lid 252. The projector main body 100 is housed in the fixed member 12. The projection window 30 including the opening section 31 is provided on the front side of the fixed member 12.

The fixed member 12 is suspended from the main ceiling RF (see FIG. 1) by suspension devices 52 capable of rising and falling (moving in the up-down direction). The fixed member 12, in which the projector main body 100 is housed, can be lifted and lowered by the suspension devices 52 together with the movable lid 252. During the non-use shown in FIG. 24A, the movable lid 252 is disposed in a position at the same height as the cover member 250. The projector main body 100 is disposed on the upper side of the cover member 250 (the ceiling plate CL).

As shown in FIG. 24B, during the use, the fixed member 12, in which the projector main body 100 is housed, is lowered by the suspension devices 52 together with the movable lid 252. Consequently, the projector main body 100 is disposed on the lower side of the cover member 250 (the ceiling plate CL) together with the projection lens 117. Consequently, it is possible to project image light toward the screen SC set on the front side and the lower side of the projector 5.

Figure 25A:
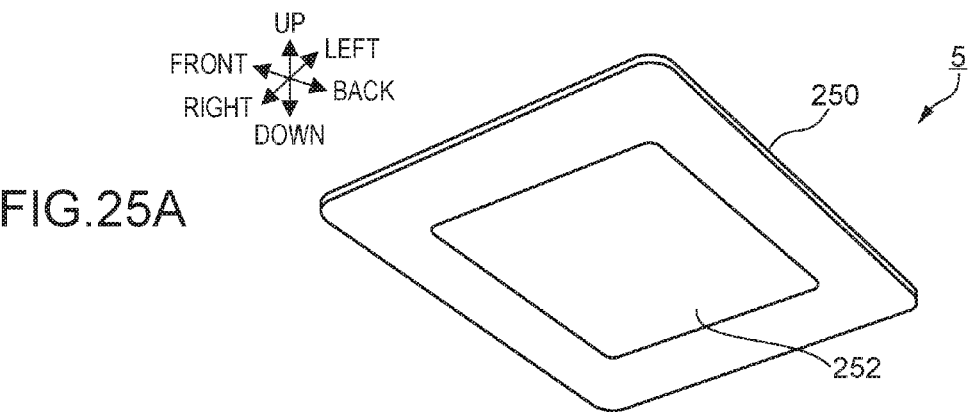
FIG. 25A is a perspective view showing the exterior of a cover member according to an example 19.
Figure 25B:
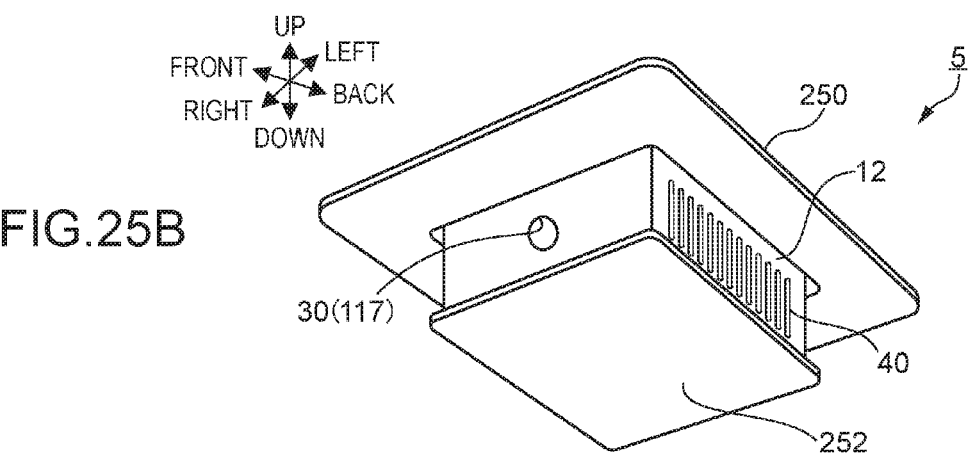
FIG. 25B is a perspective view showing the exterior of the cover member according to the example 19.
Figure 25C:
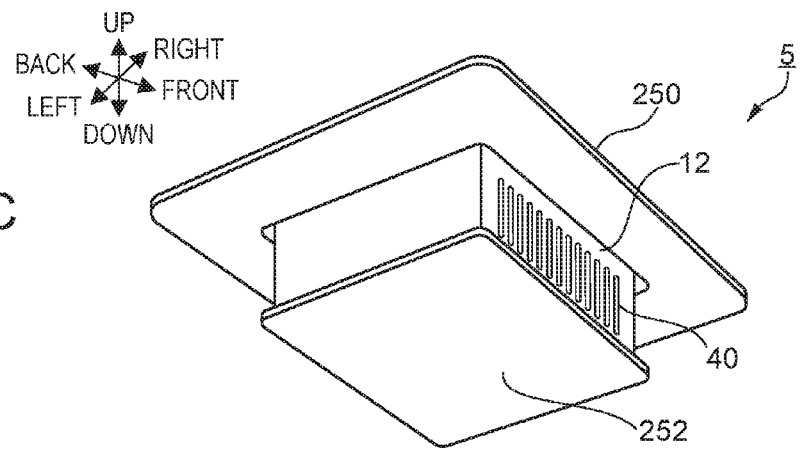
FIG. 25C is a perspective view showing the exterior of the cover member according to the example 19.

FIGS. 25A to 25C are perspective views showing the exterior of the cover member according to the example 19. Specifically, FIG. 25A is a view of the cover member 250 according to the example 19 during the non-use viewed from the front and lower sides. FIG. 25B is a view of the cover member 250 during the use viewed from the front and lower sides. FIG. 25C is a view of the cover member 250 during the use viewed from the rear and lower sides.

As shown in FIG. 25A, during the non-use, the cover member 250 and the movable lid 252 are visually recognized as being flush with each other. Therefore, it is possible to make the cover member 250 less conspicuous.

As shown in FIGS. 25B and 25C, during the use, the movable lid 252 falls together with the fixed member 12 and is disposed on the lower side of the cover member 250. The projection lens 117 inserted into the projection window 30 is disposed on the lower side of the cover member 250 (the ceiling plate CL). It is possible to project the image light.

Vent holes 40 configured by pluralities of groove-like opening sections are disposed on both the left and right sides of the fixed member 12. Therefore, it is possible to cool the projector main body 100 using the air in the indoor space. The vent hole 40 on one of both the left and right sides is an intake port and the vent hole 40 on the other is an exhaust port. Note that a configuration may be adopted in which the vent hole 40 is provided on one of the left and right sides and the intake port and the exhaust port are disposed side by side in the front-back direction.

Example 20

Figure 26A:
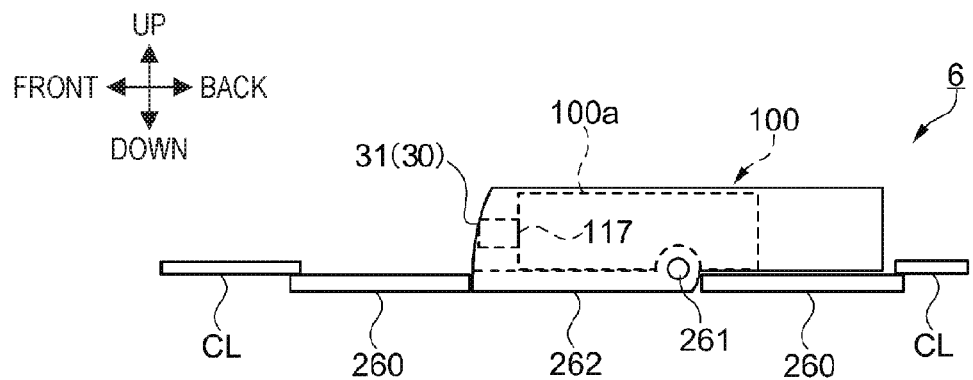
FIG. 26A is a schematic diagram showing the configuration of a main part of a projector according to an example 20 of the fourth embodiment.
Figure 26B:
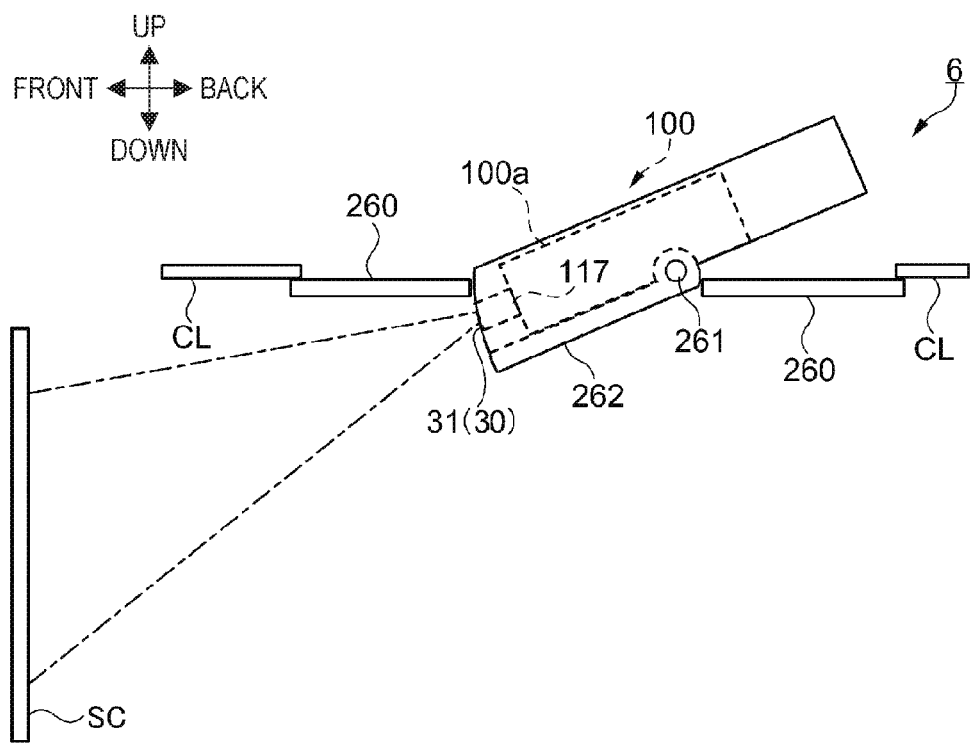
FIG. 26B is a schematic diagram showing the configuration of the main part of the projector according to the example 20 of the fourth embodiment.

FIGS. 26A and 26B are schematic diagrams showing the configuration of a main part of a projector according to an example 20 of the fourth embodiment. Specifically, FIG. 26A is a view of a projector 6 according to the example 20 viewed from the left lateral direction (the left side) during the non-use. FIG. 26B is a diagram of the projector 6 viewed from the left lateral direction (the left side) during the use.

As shown in FIG. 26A, the projector 6 according to the example 20 includes the projector main body 100 and a cover member 260. The cover member 260 includes a movable lid 262. The movable lid 262 is turnably supported by a turning shaft 261 set in the cover member 260. The movable lid 262 also functions as a fixed member that houses the projector main body 100. The projection window 30 including the opening section 31 is provided on the front side of the movable lid 262.

The projector main body 100 is housed in the movable lid 262. The projection lens 117 is inserted into the opening section 31 of the projection window 30. During the non-use, the movable lid 262 is disposed substantially in parallel to the cover member 260. Therefore, the projector main body 100 housed in the movable lid 262 is also disposed substantially in parallel to the cover member 260 on the upper side of the cover member 260 (the ceiling plate CL).

As shown in FIG. 26B, during the use, the movable lid 262 turns to the lower side about the turning shaft 261. Consequently, the movable lid 262 inclines to the front side. The front side of the movable lid 262 is disposed on the lower side of the cover member 260. Therefore, the projector main body 100 housed in the movable lid 262 also inclines to the front side. The projection lens 117 inserted into the opening section 31 of the projection window 30 is disposed on the lower side of the cover member 260 (the ceiling plate CL). Consequently, it is possible to project image light toward the screen SC set on the front side and the lower side of the projector 6.

Figure 27A:
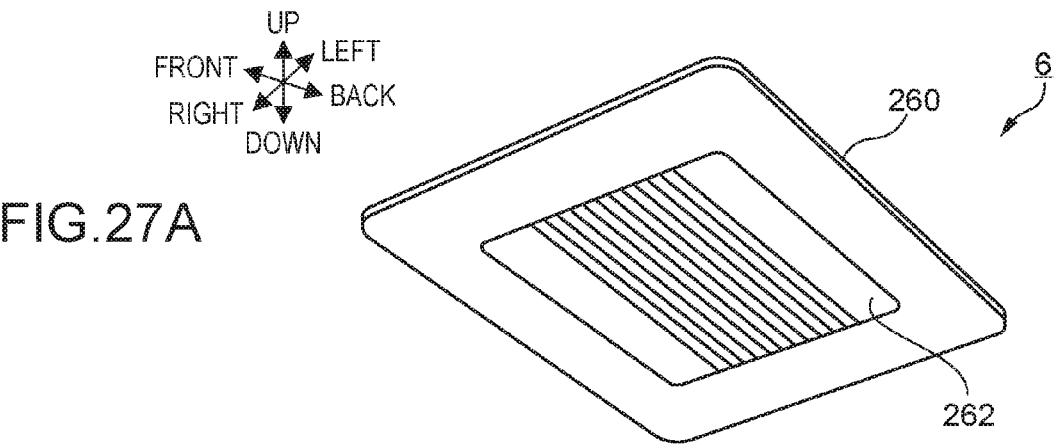
FIG. 27A is a perspective view showing the exterior of a cover member according to an example 20.
Figure 27B:
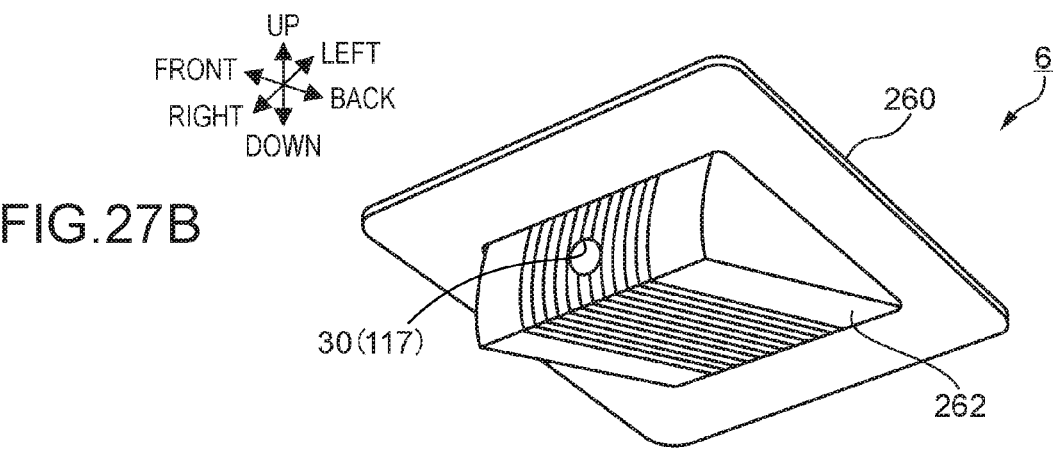
FIG. 27B is a perspective view showing the exterior of the cover member according to the example 20.
Figure 27C:
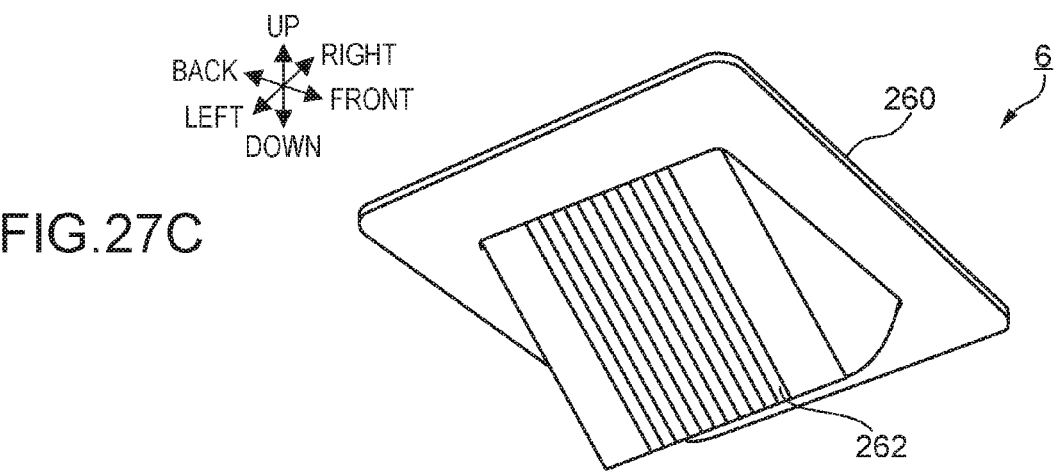
FIG. 27C is a perspective view showing the exterior of the cover member according to the example 20.

FIGS. 27A to 27C are perspective views showing the exterior of the cover member according to the example 20. Specifically, FIG. 27A is a view of the cover member 260 according to the example 20 during the non-use viewed from the front and lower sides. FIG. 27B is a view of the cover member 260 during the use viewed from the front and lower sides. FIG. 27C is a view of the cover member 260 during the use viewed from the rear and lower sides.

As shown in FIG. 27A, during the non-use, the cover member 260 and the movable lid 262 are visually recognized as being flush with each other. Therefore, it is possible to make the cover member 260 less conspicuous. As shown in FIGS. 27B and 27C, during the use, the movable lid 262 inclines to the front side. The front side of the movable lid 262 is disposed on the lower side of the cover member 260. The projection lens 117 inserted into the projection window 30 is disposed on the lower side of the cover member 260 (the ceiling plate CL). Consequently, it is possible to project the image light.

Note that, in the example 20, the housing 100a (see FIG. 1) of the projector main body 100 may also function as the movable lid 262. That is, the housing 100a of the projector main body 100 may be turnably supported by the turning shaft 261 set in the cover member 260. In the case of such a configuration, the bottom section of the housing 100a is visually recognized during the non-use shown in FIG. 27A. The front side of the projector main body 100 is disposed to be exposed to the lower side of the cover member 260 (the ceiling plate CL) during the use shown in FIGS. 27B and 27C.

The embodiments explained above only indicate forms of the invention. Modifications and applications are optionally possible within the scope of the invention. As the modifications, for example, modifications explained below are possible.

MODIFICATIONS

In the embodiments, the projector is set in the space above the ceiling plate CL set as the reference plane (the attic). The image light is projected on the screen SC located in the room interior on the lower side of the ceiling plate CL. However, the invention is not limited to such a form. For example, a configuration may be adopted in which a floor or a wall is set as the reference plane and the projector is set in a space under a floorboard (a space under the floor) or a space on the inner side.

Figure 28:
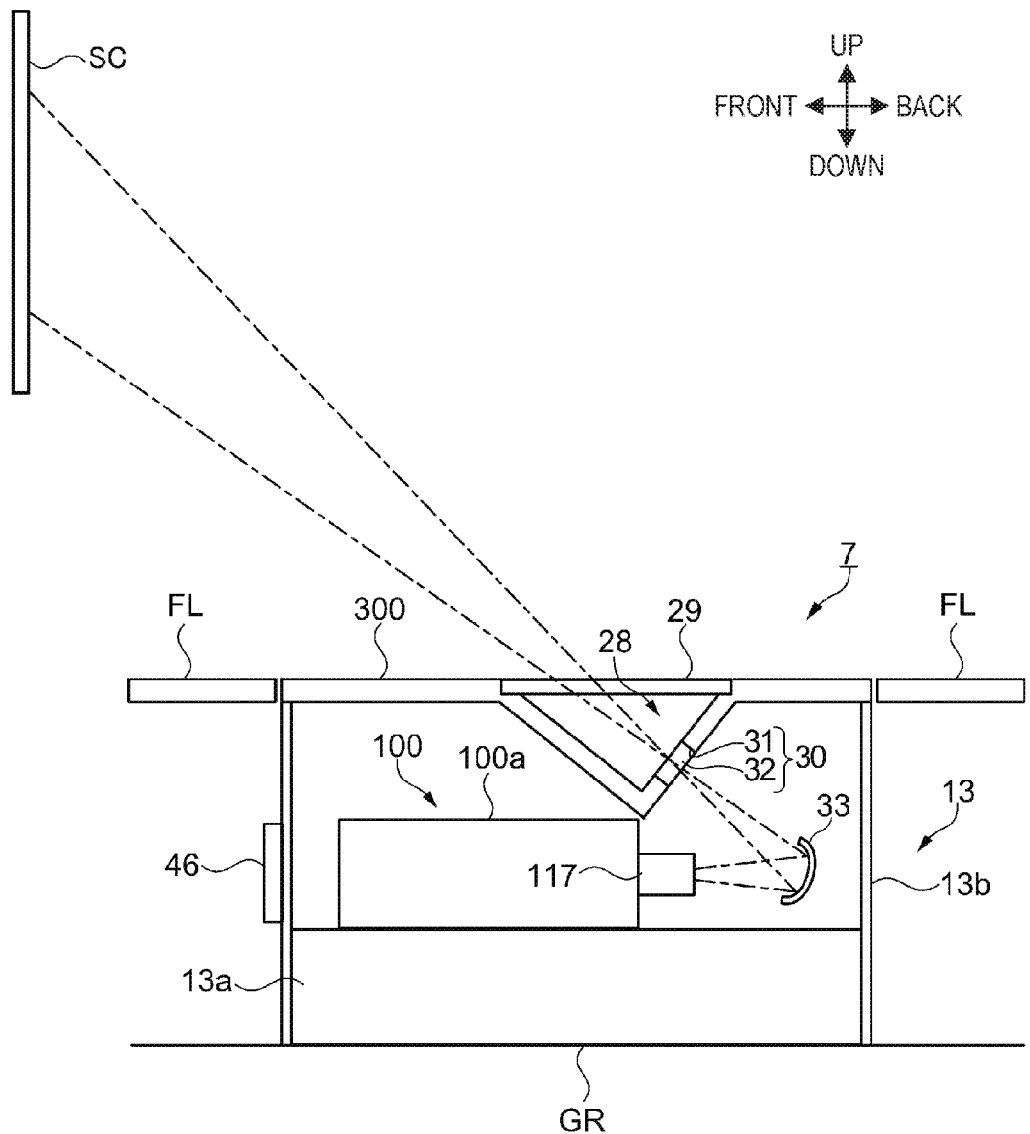
FIG. 28 is a schematic diagram showing the configuration of a projector according to a modification.

A configuration example in which the projector is set in the space under the floorboard is explained with reference to FIG. 28. FIG. 28 is a schematic diagram showing the configuration of a projector according to a modification. Components same as the components in the embodiment are denoted by the same reference numerals and signs and explanation of the components is omitted.

As shown in FIG. 28, a projector 7 according to the modification is set in a space under a floorboard FL (a space under the floor) of a store, a meeting room, a hall, or the like. Image light projected from the projector 7 is projected on the screen SC located in a room interior on the upper side of the floorboard FL.

The projector 7 includes the projector main body 100, a fixed member 13, and a cover member 300 provided with the projection window 30. The fixed member 13 includes a fixed table 13a and a supporting section 13b. The fixed table 13a is set on a foundation surface GR under the floor. The projector main body 100 is placed on the fixed table 13a. The supporting section 13b supports the cover member 300.

The cover member 300 is supported by the fixed table 13a and set substantially in parallel to the floorboard FL. The cover member 300 in the projector 7 is visually recognized from the person present in the room interior. However, the projector main body 100 and the fixed member 13 are not visually recognized. Therefore, atmosphere is not spoiled in a place where the atmosphere of an indoor space is considered important. The cover member 300 may be set on the floorboard FL.

The cover member 300 includes a projection opening 28 formed to be recessed further to the lower (under floor) side than the floorboard FL. The projection window 30 is provided in a slope on the rear side of the projection opening 28. The projection opening 28 is covered with a transparent lid 29. The surface of the cover member 300 and the surface of the transparent lid 29 are set to height substantially the same as the surface of the floorboard FL with respect to the foundation surface GR such that a level difference does not occur between the surface of the floorboard FL/the surface of the cover member 300 and the surface of the transparent lid 29.

In the projector 7, the image light projected to the rear side from the projection lens 117 is reflected on the reflecting mirror 33 toward the front side and the upper side, transmitted through the projection window 30 and the transparent lid 29, and projected on the screen SC located in the room interior on the upper side of the floorboard FL.

What is claimed is:

1. A projector comprising:
    a projecting section configured to be disposed in a space on one side of a reference plane, which is a ceiling surface or a floor surface, and configured to project image light on a projection surface located on the other side of the reference plane;
    a cover member configured to be set on the reference plane and configured to cover the projecting section;
    a moveable lid that rotates with respect to the cover member from a non-use position to a use position, the moveable lid being formed in the cover member; and
    a projection window provided in the moveable lid of the cover member and configured to transmit the image light projected from the projecting section to the other side of the reference plane,
    wherein
       the projection window is tilted with respect to the reference plane, and
       the projection window is disposed on the one side of the reference plane when the moveable lid is in the non-use position and the projection window is disposed on the other side of the reference plane when the moveable lid is in the use position.

2. The projector according to claim 1, wherein
    a recessed section recessed to the one side of the reference plane is formed in the cover member, and
    the projection window is disposed in the recessed section when the moveable lid is in the non-use position.

3. The projector according to claim 2, wherein
    an external shape of the image light projected on the projection surface is a rectangular shape, and
    an external shape of the recessed section is also the rectangular shape.

4. The projector according to claim 2, wherein
    an external shape of the image light projected on the projection surface is a substantially circular shape, and
    the external shape of the recessed section is also the substantially circular shape.

5. The projector according to claim 1, wherein the projection window is disposed substantially perpendicularly to an optical axis of the image light projected from the projecting section.

6. The projector according to claim 1, wherein a transparent plate or a lens is disposed in the projection window.

7. The projector according to claim 1, further comprising a cooling section for cooling the projecting section, wherein
    an opening section for performing at least one of intake and exhaust for cooling is formed in the cover member.

8. The projector according to claim 1, wherein the cover member is set substantially in parallel to the reference plane.

9. A projector comprising:
    a projecting section configured to be disposed in a space on one side of a reference plane, which is a ceiling surface or a floor surface, during non-use and at least partially disposed on the other side of the reference plane during use and configured to project image light on a projection surface located on the other side of the reference plane;
    a cover member configured to be set on the reference plane and configured to cover the projecting section during the non-use;
    a moveable lid that rotates with respect to the cover member from a non-use position to a use position, the moveable lid being formed in the cover member; and
    a projection window configured to transmit the image light projected from the projecting section, the projection window being formed in the moveable lid,
    wherein
       the projection window is disposed on the one side of the reference plane when the moveable lid is in the non-use position and the projection window is disposed on the other side of the reference plane when the moveable lid is in the use position.

* * * * *